United States Patent
Ettinger

(10) Patent No.: US 10,215,577 B2
(45) Date of Patent: Feb. 26, 2019

(54) SYSTEM AND METHOD FOR RATING LANDMARKS FOR USE AS ROUTE GUIDANCE IN VEHICLE NAVIGATION

(71) Applicant: UBER TECHNOLOGIES, INC., San Francisco, CA (US)

(72) Inventor: Esther Abramovich Ettinger, Laguna Beach, CA (US)

(73) Assignee: Uber Technologies, Inc., San Francisco, CA (US)

( * ) Notice: Subject to any disclaimer, the term of this patent is extended or adjusted under 35 U.S.C. 154(b) by 0 days.

(21) Appl. No.: 15/389,722

(22) Filed: Dec. 23, 2016

(65) Prior Publication Data

US 2017/0211943 A1    Jul. 27, 2017

Related U.S. Application Data

(63) Continuation of application No. 14/563,978, filed on Dec. 8, 2014, now Pat. No. 9,562,781, which is a continuation of application No. 11/785,294, filed on Apr. 17, 2007, now Pat. No. 8,930,135.

(51) Int. Cl.
*G06F 19/00* (2018.01)
*G01C 21/34* (2006.01)
*G01C 21/36* (2006.01)

(52) U.S. Cl.
CPC ......... *G01C 21/3476* (2013.01); *G01C 21/34* (2013.01); *G01C 21/3644* (2013.01)

(58) Field of Classification Search
CPC ................. G01C 21/3476; G01C 21/3644
USPC .................................. 701/426, 400
See application file for complete search history.

(56) References Cited

U.S. PATENT DOCUMENTS

| 4,974,170 | A  | 11/1990 | Bouve et al. |
| 5,470,233 | A  | 11/1995 | Fruchterman et al. |
| 5,682,525 | A  | 10/1997 | Bouve et al. |
| 5,784,059 | A  |  7/1998 | Morimoto et al. |
| 6,115,669 | A  |  9/2000 | Watanabe et al. |
| 6,339,746 | B1 |  1/2002 | Sugiyama et al. |
| 6,427,118 | B1 |  7/2002 | Suzuki |
| 6,510,379 | B1 |  1/2003 | Hasegawa et al. |
| 6,728,635 | B2 |  4/2004 | Hamada et al. |
| 6,820,005 | B2 | 11/2004 | Matsuda et al. |
| 6,944,539 | B2 |  9/2005 | Yamada et al. |

(Continued)

FOREIGN PATENT DOCUMENTS

| WO | WO-2005098362 A1 | 10/2005 |
| WO | WO-2007041547 A1 |  4/2007 |

OTHER PUBLICATIONS

"U.S. Appl. No. 11/785,284, Final Office Action dated Jan. 30, 2014", 13 pgs.

(Continued)

*Primary Examiner* — Ronnie M Mancho
(74) *Attorney, Agent, or Firm* — Schwegman Lundberg & Woessner, P.A.

(57) ABSTRACT

A mapping system is disclosed that provides route guidance in the form of a map and verbal or textual directions which includes reference to both landmarks and personal contacts. Landmarks and contacts can be rated for suitability in providing route guidance. Depending on the rating, guidance using landmarks or personal contacts can be preferentially used in place of or to supplement guidance based on the underlying road network.

20 Claims, 7 Drawing Sheets

(56) References Cited

U.S. PATENT DOCUMENTS

| | | | |
|---|---|---|---|
| 7,395,153 | B1 | 7/2008 | Nesbitt et al. |
| 7,463,972 | B2 | 12/2008 | Yamada et al. |
| 7,487,038 | B2 | 2/2009 | Kitagawa et al. |
| 7,508,321 | B2 | 3/2009 | Gueziec et al. |
| 7,532,899 | B2 | 5/2009 | Wilson et al. |
| 7,831,381 | B2 | 11/2010 | Thota |
| 7,933,897 | B2 | 4/2011 | Jones et al. |
| 7,957,871 | B1 | 6/2011 | Echeruo |
| 8,688,367 | B2 | 4/2014 | Mauderer |
| 8,930,135 | B2 | 1/2015 | Ettinger |
| 9,222,797 | B2 * | 12/2015 | Abramovich Ettinger ............ G01C 21/00 |
| 9,562,781 | B2 * | 2/2017 | Ettinger ............ G01C 21/3476 |
| 2001/0007968 | A1 | 7/2001 | Shimazu |
| 2002/0022923 | A1 | 2/2002 | Hirabayashi et al. |
| 2002/0103599 | A1 | 8/2002 | Sugiyama et al. |
| 2002/0120397 | A1 | 8/2002 | Kepler |
| 2004/0167706 | A1 | 8/2004 | Becker |
| 2004/0192311 | A1 | 9/2004 | Koskinen et al. |
| 2004/0205394 | A1 | 10/2004 | Plutowski |
| 2004/0254723 | A1 | 12/2004 | Tu |
| 2005/0065779 | A1 | 3/2005 | Odinak |
| 2005/0227676 | A1 | 10/2005 | De Vries |
| 2005/0256635 | A1 | 11/2005 | Gardner et al. |
| 2006/0069503 | A1 | 3/2006 | Suomela et al. |
| 2006/0167621 | A1 | 7/2006 | Dale |
| 2007/0016368 | A1 | 1/2007 | Chapin et al. |
| 2007/0078596 | A1 | 4/2007 | Grace |
| 2007/0078598 | A1 | 4/2007 | Watanabe et al. |
| 2007/0106469 | A1 | 5/2007 | Ishizaki |
| 2007/0115142 | A1 | 5/2007 | Nakashima |
| 2007/0143345 | A1 | 6/2007 | Jones et al. |
| 2007/0299607 | A1 | 12/2007 | Cubillo |
| 2008/0109718 | A1 | 5/2008 | Narayanaswami |
| 2008/0125967 | A1 | 5/2008 | Sprigg |
| 2008/0140310 | A1 | 6/2008 | Graef |
| 2008/0147319 | A1 | 6/2008 | Cubillo |
| 2008/0195312 | A1 | 8/2008 | Aaron et al. |
| 2008/0262714 | A1 | 10/2008 | Abramovich Ettinger |
| 2008/0262717 | A1 | 10/2008 | Ettinger |
| 2008/0319652 | A1 | 12/2008 | Moshfeghi |
| 2008/0319658 | A1 | 12/2008 | Horvitz et al. |
| 2008/0319659 | A1 | 12/2008 | Horvitz et al. |
| 2008/0319660 | A1 | 12/2008 | Horvitz et al. |
| 2009/0005981 | A1 | 1/2009 | Forstall et al. |
| 2009/0222201 | A1 | 9/2009 | Jung |
| 2010/0094536 | A1 | 4/2010 | Lee et al. |
| 2010/0324818 | A1 | 12/2010 | Gellatly et al. |
| 2014/0358425 | A1 | 12/2014 | Seth et al. |
| 2017/0211943 | A1 * | 7/2017 | Ettinger ............ G01C 21/3476 |

OTHER PUBLICATIONS

"U.S. Appl. No. 11/785,284, Final Office Action dated Apr. 28, 2011", 6 pgs.

"U.S. Appl. No. 11/785,284, Non Final Office Action dated Jan. 16, 2015", 15 pgs.

"U.S. Appl. No. 11/785,284, Non Final Office Action dated Jun. 28, 2010", 7 pgs.

"U.S. Appl. No. 11/785,284, Non Final Office Action dated Sep. 24, 2009", 8 pgs.

"U.S. Appl. No. 11/785,284, Non Final Office Action dated Oct. 14, 2010", 7 pgs.

"U.S. Appl. No. 11/785,294, Advisory Action dated Aug. 9, 2013", 3 pgs.

"U.S. Appl. No. 11/785,294, Applicant's Summary of Examiner Interview filed Nov. 13, 2013", 1 pg.

"U.S. Appl. No. 11/785,294, Final Office Action dated Feb. 26, 2013", 22 pgs.

"U.S. Appl. No. 11/785,294, Final Office Action dated Mar. 7, 2011", 20 pgs.

"U.S. Appl. No. 11/785,294, Non Final Office Action dated Jun. 21, 2012", 18 pgs.

"U.S. Appl. No. 11/785,294, Non Final Office Action dated Aug. 19, 2010", 12 pgs.

"U.S. Appl. No. 11/785,294, Non Final Office Action dated Dec. 19, 2013", 7 pgs.

"U.S. Appl. No. 11/785,294, Notice of Allowance dated Sep. 4, 2014", 7 pgs.

"U.S. Appl. No. 11/785,294, Response filed Jun. 19, 2014 to Non Final Office Action dated Dec. 19, 2013", 20 pgs.

"U.S. Appl. No. 11/785,294, Response filed Jul. 26, 2013 to Final Office Action dated Feb. 26, 2013", 15 pgs.

"U.S. Appl. No. 11/785,294, Response filed Sep. 7, 2011 to Final Office Action dated Mar. 7, 2011", 11 pgs.

"U.S. Appl. No. 11/785,294, Response filed Oct. 25, 2013 to Advisory Action dated Aug. 9, 2013", 15 pgs.

"U.S. Appl. No. 11/785,294, Response filed Nov. 21, 2012 to Non Final Office Action dated Jun. 21, 2012", 13 pgs.

"U.S. Appl. No. 11/785,294, Response filed Dec. 14, 2010 to Non Final Office Action dated Aug. 19, 2010", 21 pgs.

"U.S. Appl. No. 11/785,294, Supplemental Amendment filed Feb. 6, 2013", 9 pgs.

"U.S. Appl. No. 14/563,978, Examiner Interview Summary dated Oct. 23, 2015", 3 pgs.

"U.S. Appl. No. 14/563,978, Final Office Action dated Mar. 9, 2016", 16 pgs.

"U.S. Appl. No. 14/563,978, Non Final Office Action dated Jul. 30, 2015", 12 pgs.

"U.S. Appl. No. 14/563,978, Notice of Allowance dated Sep. 29, 2016", 9 pgs.

"U.S. Appl. No. 14/563,978, Response filed Sep. 7, 2016 to Final Office Action dated Mar. 9, 2016", 15 pgs.

"U.S. Appl. No. 14/563,978, Response filed Nov. 30, 2015 to Non Final Office Action dated Jul. 30, 2015", 12 pgs.

Caduff, David, et al., "The Landmark Spider: Representing Landmark Knowledge for Wayfinding Tasks", American Association for Artificial Intelligence (www.aaai.org), (2002), 1-6.

Ruetschi, Urs-Jakob, et al., "Routing by Landmarks", 6th Swiss Transport Research Conference, Monte Verita / Ascona, (Mar. 15-17, 2006).

* cited by examiner

SYSTEM AND METHOD FOR RATING LANDMARKS FOR USE AS ROUTE GUIDANCE IN VEHICLE NAVIGATION

CLAIM OF PRIORITY

This application is a continuation of U.S. patent Ser. No. 14/563,978 entitled "DEVICE, SYSTEM AND METHOD OF LANDMARK-BASED AND PERSONAL CONTACT-BASED ROUTE GUIDANCE" filed on Dec. 8, 2014. This application claims priority to U.S. patent application Ser. No. 11/785,294 entitled "DEVICE, SYSTEM AND METHOD OF LANDMARK-BASED ROUTING AND GUIDANCE" filed on Apr. 17, 2007 which is herein incorporated by reference. This application is also related to U.S. patent application Ser. No. 11/785,284 entitled "DEVICE, SYSTEM AND METHOD OF CONTACT-BASED ROUTING AND GUIDANCE" filed on Apr. 17, 2007 also which is herein incorporated by reference. This application is also related to U.S. patent application Ser. No. 14/975,733 entitled "NAVIGATION APPARATUS AND MAPPING SYSTEM USING PERSONAL CONTACTS" filed on Dec. 19, 2015.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Some embodiments of the invention are related to the field of mapping and route guidance.

BACKGROUND

A mapping system may present a map of a geographical location selected by a user. The mapping system may further present driving directions that allow the user to drive from a first geographical location ("origin") to a second geographical location ("destination"). The driving directions may include a graphical component, for example, a graphical marking of the suggested driving route on a graphical map presented to the user. Additionally or alternatively, the driving directions may include a textual component, for example, textual phrases instructing the user how to drive in order to reach the destination.

The driving directions may be road-based. For example, the textual driving directions may include phrases such as "Drive north on Broadway for a distance of one mile", "Turn right at the corner of 37th Street", "Drive east on 37th street for a distance of half a mile", or the like. Similarly, graphical driving directions may include a map of the relevant area, in which the route segments of the suggested driving route may be highlighted.

Unfortunately, the driving directions provided by the mapping system may be difficult to use. For example, a driver instructed to make a right turn on a certain street, may miss the turn, e.g., because of absence of an appropriate street sign at the relevant corner, because of low visibility of the street sign, or the like. Additionally, some mapping systems may utilize or generate outdated maps, incomplete maps, or other outdated content or inaccurate content.

SUMMARY

Some embodiments of the invention may include, for example, devices, systems and methods of landmark-based routing and guidance and/or contact-based routing and guidance.

In some embodiments, an apparatus includes: a route guidance information generator adapted to receive a plurality of personal contacts associated respectively with at least one of: a plurality of road-based addresses, or a plurality of latitude and longitude data items; and to generate route guidance information including a reference to at least one of the personal contacts.

In some embodiments, the route guidance information generator is adapted to include the reference in the route guidance information based on an estimated efficiency of navigation using the reference.

In some embodiments, the route guidance information includes: a first portion of route guidance information corresponding to a route portion from an origin point to one of the personal contacts; and a second portion of route guidance information corresponding to a route portion from one of the personal contacts to a destination point.

In some embodiments, the route guidance information generator is adapted to determine a route from an origin point to a destination point, wherein the route is different than the shortest route from the origin point to the destination point, and wherein the route includes a reference to at least one personal contact.

In some embodiments, the apparatus further includes a converter to convert the personal contacts from a first format associated with a computing device to a second format associated with a mapping system.

In some embodiments, the apparatus further includes a map generator that generates a map, including: at least a portion of a route from an origin point to a destination point; and an indication of a reference to at least one personal contact.

In some embodiments, an apparatus includes a map generator adapted to receive a plurality of personal contacts associated respectively with at least one of: a plurality of roadbased addresses, or a plurality of latitude and longitude data items; and to generate a map including a plurality of indications corresponding to the personal contacts.

In some embodiments, positions of the indications on the map correspond to at least one of: positions of the road-based addresses, or positions of the latitude and longitude data items.

In some embodiments, the map generator is adapted to generate a map including a subset of indications corresponding respectively to a selected subset of the plurality of personal contacts.

In some embodiments, the map generator is adapted to generate a map selectively including one or more indications corresponding respectively to one or more personal contacts located within a pre-defined range from a destination point.

In some embodiments, a method includes: receiving a plurality of personal contacts associated respectively with at least one of a plurality of road-based addresses, or a plurality of latitude and longitude data items; and generating route guidance information including a reference to at least one of the personal contacts.

In some embodiments, generating includes, for example: including or inserting a reference in the route guidance information to at least one of the personal contacts based on an estimated efficiency of navigation using the reference.

In some embodiments, generating includes: generating a first portion of route guidance information corresponding to a route portion from an origin point to one of the personal contacts; and generating a second portion of route guidance information corresponding to a route portion from one of the personal contacts to a destination point.

In some embodiments, the method further includes determining a route from an origin point to a destination point, wherein the route is different than the shortest route from the origin point to the destination point, and wherein the route includes a reference to at least one personal contact.

In some embodiments, the method further includes converting personal contacts from a first format associated with a computing device to a second format associated with a mapping system.

In some embodiments, generating includes generating a map having at least a portion of a route from an origin point to a destination point, and an indication of a reference to at least one personal contact.

In some embodiments, a method includes: receiving a plurality of personal contacts associated respectively with at least one of: a plurality of road-based addresses, or a plurality of latitude and longitude data items; and generating a map including a plurality of indications corresponding to personal contacts.

In some embodiments, generating includes generating a map having positions of indications corresponding to at least one of: positions of the road-based addresses, or positions of the latitude and longitude data items.

In some embodiments, generating includes generating a map having a subset of indications corresponding respectively to a selected subset of a plurality of personal contacts.

In some embodiments, generating includes generating a map selectively including one or more indications corresponding respectively to one or more personal contacts located within a pre-defined range from a destination point.

In some embodiments, an apparatus includes a route guidance information generator adapted to generate route guidance information including one or more road based references and one or more landmark-based references.

In some embodiments, the route guidance information generator is adapted to selectively include a landmark-based reference in the route guidance information based on the efficiency of navigation using the landmark-based reference.

In some embodiments, the route guidance information generator is adapted to include in the route guidance information a reference to at least one of: an address of a personal contact associated with a user, or a latitude and longitude data item of the personal contact associated with the user.

In some embodiments, the route guidance information generator is adapted to select, based on one or more pre-defined criteria, a first landmark from a plurality of navigation landmarks, and to generate route guidance information including a reference to the selected landmark.

In some embodiments, the route guidance information generator is adapted to selectively include a reference to a first landmark in the route guidance information and to selectively exclude a reference to a second landmark from the route guidance information if a visibility of the first landmark from a route segment is greater than a visibility of the second landmark from the route segment.

In some embodiments, the route guidance information generator is adapted to selectively include a reference to a first landmark in the route guidance information and to selectively exclude a reference to a second landmark from the route guidance information if the first landmark is included in a list of cooperating landmarks and the second landmark is not included in the list of cooperating landmarks.

In some embodiments, the route guidance information generator is adapted to selectively include a reference to a first landmark in the route guidance information if it is contextually associated with a destination.

In some embodiments, the route guidance information generator is adapted to generate route guidance information including a reference to an off-route landmark.

In some embodiments, the off-route landmark is selected from a group consisting of: landmarks located away from a node of the route, landmarks located away from a route segment, landmarks located away from an intersection of route segments, landmarks located along a route segment, and landmarks inaccessible by vehicle from the route.

In some embodiments, the apparatus further includes a landmark database operably associated with at least one of: a map generator, a route generator, and the route guidance information generator, wherein the landmark database is adapted to store landmark description data associated with landmark location data; and an updater to automatically update information stored in the landmark database based on input received from one or more client devices located remotely from the landmark database.

In some embodiments, the input received consists of at least one of the following: an input indicating a request to add a new landmark, an input indicating a request to delete a landmark, an input indicating a request to modify a landmark location, and an input indicating a request to modify a landmark description.

In some embodiments, at least one of the landmark description data and the landmark location data is associated with a quality indicator value In some embodiments, the route guidance information generator generates route guidance information including a reference to the landmark description data if the quality indicator value is greater than a pre-defined threshold.

In some embodiments, an apparatus includes a route guidance information generator adapted to generate route guidance information having a navigation reassurance information item.

In some embodiments, the navigation reassurance information item includes an information item associated with a landmark visible from a segment of the route.

In some embodiments, the navigation-reassurance item includes information indicating to a traveler he/she is on the correct route.

In some embodiments, a method includes generating route guidance information including one or more road-based references and one or more landmark-based references.

In some embodiments, the method further includes, for example: including or inserting a landmark-based reference in the route guidance information based on efficiency of navigation using the landmark-based reference.

In some embodiments, the method includes, for example: including or inserting in the route guidance information a reference to at least one of: an address of a personal contact associated with a user, or a latitude and longitude data item of the personal contact associated with the user.

In some embodiments, the method includes, based on one or more pre-defined criteria, selecting a first landmark from a plurality of navigation landmarks and generating route guidance information including a reference to the landmark.

In some embodiments, the method includes, for example: selectively including or inserting a reference to a first landmark in the route guidance information and selectively excludes a reference to a second landmark from the route guidance information if a visibility of the first landmark from a route segment is greater than a visibility of the second landmark from the route segment.

In some embodiments, the method includes, for example: selectively including or inserting a reference to the first landmark in the route guidance information and selectively excludes a reference to a second landmark from the route guidance information if the first landmark is included in a list of cooperating landmarks and the second landmark is not included in the list of cooperating landmarks.

In some embodiments, the method includes, for example: selectively including or inserting a reference to a first landmark in the route guidance 'information if the first landmark is contextually associated with a destination of the route.

In some embodiments, the method includes generating route guidance information including a reference to an off-route landmark.

In some embodiments, generating route guidance information which includes an off-route landmark selected from a group consisting of: landmarks located away from a node of the route, landmarks located away from a route segment, landmarks located away from an intersection of route segments, landmarks located along a route segment, and landmarks inaccessible by vehicle from the route.

In some embodiments, the method includes creating a landmark database operably associated with at least one of: a map generator, a route generator, and the route guidance information generator, wherein the landmark database is adapted to store landmark description data associated with landmark location data; and the method further includes, for example, automatically updating information stored in the landmark database based on input received from one or more client devices located remotely from the landmark database.

In some embodiments, updating includes information updates based on selected input received, including, for example: an input indicating a request to add a new landmark, an input indicating a request to delete a landmark, an input indicating a request to modify a landmark location, and an input indicating a request to modify a landmark description.

In some embodiments, at least one of the landmark description data and the landmark location data is associated with a quality indicator value.

In some embodiments, the method includes: generating route guidance information including a reference to the landmark description data if the quality indicator value is greater than a pre-defined threshold.

In some embodiments, a method includes generating route guidance information including a navigation reassurance information item.

In some embodiments, generating the navigation reassurance information item includes generating an information item associated with a landmark visible from a segment of the route.

In some embodiments, generating the navigation reassurance information item includes generating an information item indicating to a traveler he/she is on the correct route.

Some embodiments may include, for example, a computer program product including a computer-useable medium including a computer-readable program, wherein the computer-readable program, when executed on a computer, causes the computer to perform methods in accordance with some embodiments of the invention.

Some embodiments of the invention may provide other and/or additional benefits and/or advantages.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
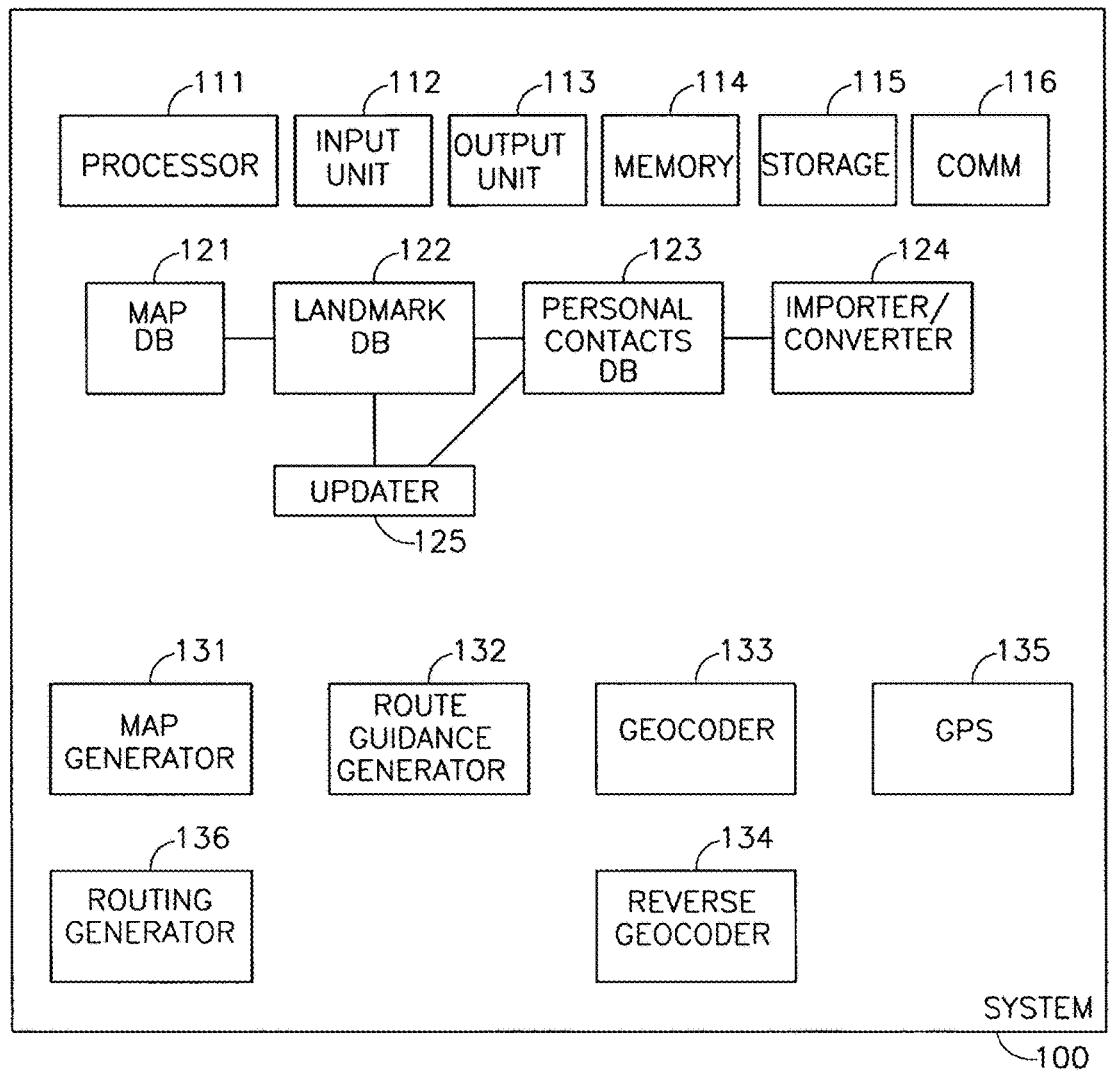
FIG. 1 is a schematic block diagram illustration of a mapping system able to generate landmark-based route guidance information in accordance with a demonstrative embodiment of the invention.

In the following detailed description, numerous specific details are set forth in order to provide a thorough understanding of some embodiments of the invention. However, it will be understood by persons of ordinary skill in the art that embodiments of the invention may be practiced without these specific details. In other instances, well-known methods, procedures, components, units and/or circuits have not been described in detail so as not to obscure the discussion.

Embodiments of the invention may be used in a variety of applications. Some embodiments of the invention may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a non-mobile or non-portable device, a display unit, a monitor, a screen, a projector, a cathode ray tube (CRT) screen or monitor, a liquid crystal display (LCD) screen or monitor, a plasma screen or monitor, a touch screen, a projector device, a set-top box, a wireless communication station, a wireless communication device, a wireless access point (AP), a modem, a network, a wireless network, a local area network (LAN), a wireless LAN (WLAN), a metropolitan area network (MAN), a wireless MAN (WMAN), a wide area network (WAN), a wireless WAN (WWAN), a personal area network (PAN), a wireless PAN (WPAN), devices and/or networks operating in accordance with existing IEEE 802.11, 802.11a, 802.11b, 802.11e, 802.11g, 802.11h, 802.11i, 802.11n, 802.16, 802.16d, 802.16e standards and/or future versions and/or derivatives and/or long term evolution (LTE) of the above standards, units and/or devices which are part of the above networks, one way and/or two-way radio communication systems, cellular radio-telephone communication systems, a cellular telephone, a wireless telephone, a personal communication systems (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, or the like.

Some embodiments of the invention may be used in conjunction with one or more types of wireless communication signals and/or systems, for example, radio frequency (RF), infra red (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, multi-carrier modulation (MDM), discrete multi-tone (DMT), Bluetooth®, global positioning system (GPS), Wi-Fi, ZigBee™, global system for mobile communication (GSM), 2G, 2.5G, 3G, 3.5G, or the like. Embodiments of the invention may be used in various other devices, systems and/or networks.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. For example, "a plurality of items" may include two or more items.

Although portions of the discussion herein may relate, for demonstrative purposes, to wired links and/or wired communications, embodiments of the invention are not limited in this regard, and may include one or more wired links, may utilize one or more components of wireless communication, may utilize one or more methods or protocols of wireless communication, or the like. Some embodiments of the invention may utilize wired communication and/or wireless communication, for example, universal serial bus (USB) communication, FireWire or IEEE 1394 communication, Ethernet communication, serial or parallel communication, or the like.

Although embodiments of the invention are not limited in this regard, the term "mapping system" as used herein may include, for example, a device or system able to generate and/or render and/or present a map, a device or system able to geo-locate and/or geo-translate, a device or system able to selectively display landmarks on top of maps and/or instead of maps and/or in addition to maps, a device or system able to generate and/or render and/or present one or more (e.g., different) map views, a device or system able to generate and/or present driving directions, a device or system able to calculate or determine routes, a device or system able to perform routing and/or route selection, a navigation device or system, a location device or system, a route guidance device or system, or the like. Although embodiments of the invention are not limited in this regard, the term "mapping system" as used herein may include, for example, one or more units, devices or systems able to perform mapping, routing, route guidance generation, displaying or presenting a map, displaying or presenting a route, displaying or presenting route guidance information, dynamically modifying maps and/or routes and/or route guidance information (e.g., utilizing GPS data or real time data or dynamic data), or the like.

Although embodiments of the invention are not limited in this regard, the term "route guidance" as used herein may include, for example, textual route guidance and/or driving directions, graphical route guidance and/or driving directions, audible route guidance and/or driving directions, projected route guidance and/or driving directions, printed route guidance and/or driving directions, route guidance and/or driving directions generated and/or presented using graphics and/or audio and/or video and/or animation and/or projections, two-dimensional (2D) or three-dimensional (3D) rendering, elevations, walking directions, flying directions, or the like.

Although embodiments of the invention are not limited in this regard, the term "landmark" as used herein may include, for example, various objects or items which may be used for route guidance, navigation, route recognition, destination recognition, or the like. In some embodiments, a landmark may include, for example, a conspicuous object or item or structure that may be used to mark or distinguish a locality or a point-of-interest (POI), or an object or item or structure which may be used as a point of orientation or may facilitate recognizing or identifying a locality or a POI. In some embodiments, a "landmark" may include a well-known, substantially permanent, recognizable or easily recognizable geographic feature. In some embodiments, a landmark may include, for example, a statue, a sculpture, a piece of art, a water fountain, a road sign, a sign, a public transport station, a bus station, a subway station, a train station, a playground, a sports ground or field, a monument, a historical structure, a utility structure, a windmill, a water container, a water silo, an agriculture structure, an open market, a parking, a bridge, a board walk, a street sign, an advertisement sign, a billboard, a tower, a high building, a structure, a high structure, a column, a citadel, a castle, a high rise, a pillar, a skyscraper, a building, a wall, a construction, a formation, a flag, a beacon, a clock tower, an arc, or the like. In some embodiments, a landmark may include, for example, a business establishment, a private house, a public house, a branch of a business establishment, a bank, a financial institution, an entertainment venue, a theater, a cinema, a stadium, a ball field, a supermarket, a grocery store, a shop, a coffee shop, a clothes shop, a church, a synagogue, a religious center, a hospital, a medical center, a medical clinic, a school, a university, a sports arena or stadium, a sports venue, an entertainment venue, a theater, a museum, a railway, a train station, a building or structure having a unique shape or size, a building or structure which is relatively easily recognizable, a well-known building or structure, a substantially permanent or non-temporary structure, land-use feature(s) (e.g., a lake, a river, a forest, a dune), or the like. In some embodiments, a landmark may include, for example, a visible indication, a graffiti or a mural painted on a wall, towers, mountains, lakes, a blinking sign, an animated sign, a moving lights sign, or the like. In some embodiments, a landmark may include, for example, an item or object that is not part of a route, an off-route or off-network item or object, an item or object which may not be directly accessed or directly reached by a vehicle, an item or object which may not be driven-on or driven-through, an item or an object that is external to a route or to a route segment, or the like. In some embodiments, a landmark may include, for example, an item or object away from a route or from a route segment, an item or object distant from a route or a route segment, an item or object which may not be at a junction or a crossroad route segments, or the like.

In some embodiments, a landmark may be used for routing, route guidance, navigation, reassurance, recognition, and/or other purposes, optionally in connection with reaching to, or recognizing, a POI which a particular user (or a group of users) may find useful or interesting. In some embodiments, a landmark may be, whereas a POI may not necessarily be, useful for routing, route guidance, navigation, reassurance, recognition, and/or other purposes. For example, a substantially "hidden" or not visible barber shop located at the back area of a second floor in a "strip mall" may be a POI for one or more users, but may not be used efficiently as a landmark for routing, route guidance, navigation, reassurance, recognition, and/or other purposes. In some embodiments, a landmark may be used for routing, route guidance, navigation, reassurance, recognition, and/or other purposes, as well as POIs, business listings, land-use features, or the like.

Although embodiments of the invention are not limited in this regard, the term "map" as used herein may include, for example, a street-based map, a road-based map, a street map, a road map, a geographical map, a vector map, a raster map, a topographic map, a city map, a digital chart, a bird's eye view map, a satellite map, a pictorial map, a 2D map, a 3D map, a traffic map, or the like. In some embodiments, a "map" need not necessarily be a graphical representation, but may be or may include data or information (e.g., content of a database) from which a graphical map may be generated or from which a rendering may be generated or from which route guidance information may be generated.

In some embodiments, a map may include features, classifications (or feature categories), and attributes. Features may include, for example, line features, area features, and/or point features. Attributes may include descriptions of features. For example, a road may be a feature which may be classified into types (e.g., freeways, arterials, streets, unpaved roads, etc.). A road of a particular type may be attributed as a one-way road, restricted to non-residents between 08:00 and 17:00, of a primary name "Sixth Avenue", of an alternate name "Avenue of the Americas", with an address ranging from one number to another number on one side and another range on the other side, of speed limit "50 miles per hour", or the like.

Although embodiments of the invention are not limited in this regard, the term "road-based" as used herein may relate to, for example, a system or method that utilizes roads (e.g., streets, avenues, boulevards, highways, freeways, road networks, street networks, or the like) and their attributes (e.g., street names, address range, turn restrictions, lane information, speed limit, or the like) in order to generate a map, to determine a route, to generate route-guidance information, or to perform other navigation-related operations.

Although embodiments of the invention are not limited in this regard, the term "navigation" as used herein may include, for example, one or more navigation-related or navigation-associated operations, for example, generating a map, utilizing a map, route planning, determining a route from an origin to a destination, generating route guidance information, positioning, generating or handling GPS information, or the like.

Although embodiments of the invention are not limited in this regard, the term "mapping" as used herein may include, for example, generating or rendering a map, generating or rendering a portion of a map, generating or rendering a layer which may be overlaid onto a map, combining or overlaying one or more layers onto a map, combining or overlaying multiple map layers, or the like.

Although embodiments of the invention are not limited in this regard, the term "routing" as used herein may include, for example, determining a route from an origin to a destination, calculating a route from an origin to a destination, selecting a route from an origin to a destination, suggesting one or more alternative routes from an origin to a destination, determining one or more route segments or route portions that allow a user to go from an origin to a destination, or the like.

Although portions of the discussion herein may refer, for demonstrative purposes, to an itinerary, a route, a route plan, a map, or route guidance information that refer to one origin and one destination, embodiments of the invention are not limited in this regard, and may be used in conjunction with multiple origins and/or multiple destinations.

Although embodiments of the invention are not limited in this regard, the term "personal contact" as used herein may include, for example, a personal contact associated with a user or with multiple users, a business contact associated with a user or with multiple users, or other type of contact or one or more attributes thereof, for example, names, addresses, longitude and latitude, telephone numbers, facsimile numbers, electronic mail (Email) addresses, web-site addresses (URLs), or the like.

Although embodiments of the invention are not limited in this regard, the terms "personal contact list" and/or "personal contact database" as used herein may include, for example, one or more personal contacts which may be stored in a mobile or portable computing device, a cellular phone, a mobile phone, a PDA device, a hybrid PDA/mobile-phone device, a laptop, an Email application (e.g., Microsoft® Outlook®, Microsoft® Outlook Express®, or the like), a database application (e.g., Microsoft® Excel®, Microsoft® Access®, or the like), a customer relationship management (CRM) system (e.g., SAP®, Siebel®, SalesForce®), a remotely-stored list of contacts, a locally-stored list of contacts, or other lists or databases of personal contacts.

In some embodiments, a landmark may be or may include a personal contact. In some embodiments, a personal contact may be or may include a landmark.

Although embodiments of the invention are not limited in this regard, the term "user" as used herein may include, for example, an end user, an intermediary user, an operator, a telephone operator, an administrator, a home user, a business user, an enterprise, a customer, a consumer, a driver, a hiker, a traveler, a rider, or the like.

Some embodiments of the invention may include, may be operably associated with, or may otherwise utilize, GPS data, GPS receivers, GPS transceivers, GPS chips, GPS-enabled units, real time GPS data, or other GPS-related information or components.

Although portions of the discussion herein may relate, for demonstrative purposes, to GPS or GPS-related devices, embodiments of the invention are not limited in this regard, and may be used in conjunction with other (e.g., non-GPS or non-GPS-based) devices, location pointing devices, compasses or compass-based devices, gyroscopes or gyroscope-based devices, or the like.

Although embodiments of the invention may relate, for demonstrative purposes, to driving directions" and/or to route guidance information that may include "driving directions", embodiments of the invention are not limited in this regard (e.g., are not limited to "driving" or to traveling using a vehicle), and may include various other types of directions or information, for example, walking directions, running directions, jogging directions, bicycling directions, hiking directions, motor biking directions, horse trail directions, horse riding directions, flying directions, sailing directions, boating directions, swimming directions, traveling directions, directions suitable or tailored for a particular group of travelers (e.g., drivers, hikers, joggers, handicapped persons, children, or the like), or other types of directions.

Although embodiments of the invention are not limited in this regard, the term "node" as used herein may include, for example, a junction, a road junction, a crossroad, an end of a street, an end of a road, an end of a route segment, a point or location at which a traveler is required to make a turn or to modify its traveling direction, a point or location at which it is possible for a traveler to make a turn or to modify its traveling direction, a decision point in a routing network, or the like.

Although embodiments of the invention are not limited in this regard, the term "link" as used herein may include, for example, a map-segment or map-portion or route-segment or route portion that connects between nodes. For example, two nodes may be decision-points or maneuver-points, and a link may be a route segment that connects the two nodes.

Although embodiments of the invention are not limited in this regard, the term "recognition" as used herein may include, for example, determining or understanding by a user that a particular landmark is indeed the one the user is looking for, or determining or understanding by a user that a particular maneuver or decision is correct. For example, in some embodiments, a user may be looking for a destination point which is a particular restaurant; the user may not "recognize" that particular restaurant because it does not have a prominently visible sign or banner showing the restaurant name, and the user may "recognize" that particular restaurant because route guidance information indicates to the user that the restaurant is pyramid shaped and the user "recognizes" the structural shape. This "recognition" of a landmark may further be referred to as "identification" of the landmark. In some embodiments, recognition or identification may be used, for example, in conjunction with destination points, decision points, waypoints, routes, route segments, or the like. For example, route guidance information may advise the user to make a right turn at the corner of Broadway and 37th street, and that the corner can be recognized or identified by a graffiti sign; and the user may indeed recognize or identify the corner, at which a turn is required, based on the identifying graffiti sign. In some embodiments, a "recognition information item" may include an information item that allows the user to make an appropriate maneuver or decision or determination.

Although embodiments of the invention are not limited in this regard, the term "reassurance" as used herein may include, for example, noticing or understanding by a user that an already-performed (or currently-performed) decision, maneuver or determination is correct. For example, in some embodiments, route guidance information may advise the user to drive along road I-95 for a distance of ten miles, and a reassurance information item may advise the user that while he drives on that portion of road I-95 he can expect to see a lake on his left side. Upon actually seeing the lake on his left side, and based on the reassurance information item, the user may be reassured that he is driving along the correct road. In contrast, if the user drives for approximately ten miles on a road, which he believes to be road I-95, but does not see a lake on his left side, then the driver may understand—based on the reassurance information item—that his belief is incorrect and that he is not traveling on road I-95. In some embodiments, reassurance may be achieved immediately after performing a maneuver, or after a time period passed or a distance was traveled from the maneuver.

FIG. 1 schematically illustrates a block diagram of a mapping system 100 able to generate landmark-based route guidance information in accordance with a demonstrative embodiment of the invention. System 100 may include, for example, a processor 111, an input unit 112, an output unit 113, a memory unit 114, a storage unit 115, and a communication unit 116. System 100 may optionally include other suitable hardware components and/or software components.

In some embodiments, the components of system 100 may be enclosed in, for example, a common housing, packaging, or the like, and may be interconnected or operably associated using one or more wired or wireless links. In other embodiments, for example, components of system 100 may be distributed among multiple or separate devices, may be implemented using a client/server configuration or system, may communicate using remote access methods, or the like.

Processor 111 may include, for example, a central processing unit (CPU), a digital signal processor (DSP), a microprocessor, a host processor, a controller, a plurality of processors or controllers, a chip, a microchip, one or more circuits, circuitry, a logic unit, an integrated circuit (IC), an application-specific IC (ASIC), or any other suitable multi-purpose or specific processor or controller. Processor 111 may, for example, execute instructions, execute one or more software applications, and process signals and/or data transmitted and/or received by system 100.

Input unit 112 may include, for example, a keyboard, a keypad, a mouse, a touch-pad, a stylus, a scanner, a microphone, or other suitable pointing device or input device. Output unit 113 may include, for example, a cathode ray tube (CRT) monitor or display unit, a liquid crystal display (LCD) monitor or display unit, a plasma screen, a screen, a touch screen, a monitor, a projector, a speaker, or other suitable display unit or output device.

Memory unit 114 may include, for example, a random access memory (RAM), a read only memory (ROM), a dynamic RAM (DRAM), a synchronous DRAM (SD-RAM), a flash memory, a volatile memory, a non-volatile memory, a cache memory, a buffer, a short term memory unit, a long term memory unit, or other suitable memory units or storage units. Storage unit 115 may include, for example, a hard disk drive, a floppy disk drive, a compact disk (CD) drive, a CD-ROM drive, a digital versatile disk (DVD) drive, or other suitable removable or non-removable storage units. Memory unit 114 and/or storage unit 115 may, for example, store data processed by system 100.

Communication unit 116 may include, for example, a wired or wireless network interface card (NIC), a wired or wireless modem, a wired or wireless receiver and/or transmitter, a wired or wireless transmitter-receiver and/or transceiver, a radio frequency (RF) communication unit or transceiver, a GPS unit, a GPS chip, a GPS receiver, a GPS transceiver, or other units able to transmit and/or receive signals, blocks, frames, transmission streams, packets, messages and/or data. Communication unit 116 may optionally include, or may optionally be associated with, for example, one or more antennas, e.g., a dipole antenna, a monopole antenna, an omni-directional antenna, an end fed antenna, a circularly polarized antenna, a micro-strip antenna, a diversity antenna, or the like.

System 100 may further include, for example, a map generator 131 and a route guidance generator 132. The map generator 131 may include a module or a unit able to generate and/or render a map or a portion thereof, for example, corresponding to geographical area or corresponding to a route between an origin and a destination with possible in-between waypoints. The route guidance generator 132 may include a module or a unit able to generate route guidance information associated with moving from an origin to a destination. System 100 may optionally include a routing generator 136, for example, a module or a unit able to determine or calculate a route from an origin to a destination. In some embodiments, routing generator 136 may be implemented, for example, in combination with map generator 131, in combination with route guidance generator 132, or as a stand-alone or separate routing unit.

The map generator 131 and the route guidance generator 132 may be operably associated with one or more databases, for example, a map database 121, a landmark database 122, and a personal contact database 123. Optionally, map generator 131 and/or route guidance generator 132 may utilize a geocoder 133 and/or a reverse geocoder 134, for example, including modules or units able to convert street-based address data to latitude/longitude data or vice versa. In some embodiments, optionally, map generator 131 and/or route guidance generator 132 may be operable associated with, or may utilize, a GPS unit 135, for example, a GPS receiver, a GPS transceiver, a GPS positioning unit, a GPS information generator unit, or the like.

The map database 121 may include, for example, geographical information, spatial information, geo-spatial information, data from which a map may be generated and/or rendered by map generator 131, and/or data from which route guidance information may be generated by route guidance generator 132.

The landmark database 122 may include, for example, data indicating a geographical location and/or spatial location and/or geo-spatial location of a landmark, as well as a description (e.g., a textual description, a graphical description, or the like) associated with the landmark. The landmark database 122 may optionally include one or more linked databases or related databases, or may be operably linked or related to other databases.

For example, in some embodiments, a first record in the landmark database 122 may include a category such as "Water Fountain" and a description attribute or a name attribute such as "The Happy Lion", and may be associated with a location attribute of "North-eastern corner of 53 rd Street and 6th Avenue in New York, N.Y., United States" or a representation thereof A second record in the landmark database 122 may include a category such as "Building", and a description attribute or a name attribute such as "Flatiron Building", and may be associated with a location of "175 Fifth Avenue, New York, N.Y., United States" or with a latitude value of 40.740996 and a longitude value of −73.989805. The landmark database 122 may include various other and/or additional categories and attributes, for example, a category, a sub-category, a name attribute, a description attribute, a location attribute, a functional attribute associated with a function of the landmark, one or more visualization attributes associated with visual characteristics of the landmark, or the like. Visualization attributes and/or other attributes may include, for example, textual information, graphical information, audio information, video information, photographs, pictorial information, illustrations, animation, audio/video information, icons, iconized information, 2D information, 3D information, or the like.

In some embodiments, the landmark database 122 may include information of pre-defined landmarks. In some embodiments, mapping system 100 may be configured such that the information stored in the landmark database 122 may not be modified, updated, deleted and/or augmented by remote users that utilize the mapping system 100, and/or such that the information stored in the landmark database 122 may be selectively modified, updated, deleted and/or augmented by a system administrator controlling the mapping system 100. In other embodiments, some portions of the information stored in the landmark database 122 may not be modified by users of the mapping system 100, for example, information related to certain historic landmarks, famous buildings, monuments, or the like; whereas other portions of the information stored in the landmark database may be modified by users of the mapping system 100, for example, information related to coffee shops or bank branches. In yet other embodiments, substantially all the information stored in the landmark database 100 may be modified by users of the mapping system, for example, to allow dynamic updating and/or correction of the information stored in the landmark database 122. In some embodiments, optionally, an updater unit or module 125 may be used to perform manual updating or modification of the landmark database 122, automatic updating or modification of the landmark database 122, and/or user-based or user feedback-based updating or modification of the landmark database 122.

The personal contacts database 123 may include, for example, a list or database of personal contacts associated with a user or with multiple users. The personal contacts database 123 may include, for example, names, addresses, longitude and latitude, telephone numbers, facsimile numbers, electronic mail (Email) addresses, web-site addresses (URLs), or the like. In some embodiments, for example, the personal contacts database 123 may include a list stored in a mobile computing device, a cellular phone, a mobile phone, a PDA device, a hybrid PDA/mobile-phone device, a laptop, an Email application (e.g., Microsoft® Outlook®, Microsoft® Outlook Express®, or the like), a database application (e.g., Microsoft® Excel®, Microsoft® Access®, or the like), a customer relationship management (CRM) system (e.g., SAP®, Siebel®, SalesForce®), or other lists of personal contacts. In some embodiments, optionally, the personal contacts database 123 may be stored in a remote (e.g., mobile or portable) device or unit. In some embodiments, optionally, the personal contacts database 123 may include information converted, imported and/or exported from a first format to a second format. In some embodiments, optionally, information stored in the personal contacts database 123 may be converted or re-formatted to accommodate a pre-defined information exchange format utilized by mapping system 100. Optionally, information conversion or re-formatting may be performed, for example, prior to or subsequent to storing the information in the personal contacts database 123. In some embodiments, optionally, personal contacts information may be imported, converted and/or re-formatted from a first format to a second format utilizing an importer/converter module 124, which may be included in mapping system 100 or may be operably associated with mapping system 100 or with personal contacts database 123.

In some embodiments, map generator 131 may generate and/or render a map using the information stored in the map database 121, optionally utilizing geocoder 133, reverse geocoder 134, and/or a or GPS unit 135. The generated map may optionally include multiple layers. For example, a first layer of the generated map may optionally include road-based geographical information, e.g., showing streets and avenues, showing street names, or the like. A second layer of the generated map may optionally include photograph-based geographical information, e.g., satellite photographs or portions thereof. A third layer of the generated map may optionally include landmarks, e.g., bank branches, coffee shops, monuments, water fountains, or the like. A fourth layer of the generated map may optionally include personal contact information converted into geo-spatial information, e.g., indications corresponding to addresses included in the personal contacts database. The generated map may include other layers or other combinations of layers.

In some embodiments, the generated map may include a road-based map showing streets and avenues, whereas additional map layers (e.g., personal contacts, landmarks, or the like) may be overlaid on top of the map. For example, one or more information layers may be substantially separate from the generated map, and may be overlaid or superimposed on the generated map. In other embodiments, the generated map may integrally include both the road-based map and one or more generated layers (e.g., personal contacts, landmarks, or the like).

In some embodiments, layers may be generated and/or presented in accordance with a pre-defined order or a user-selectable order. In some embodiments, layers may be removed or added from the map in response to a user request. In some embodiments, a user interface (UI) or a graphical UI (GUI) may be utilized to allow a user to add or remove layers or sets of layers, to toggle a layer on and off, to switch among pre-defined sets of layers, or to otherwise control layers of the generated map. In some embodiments, layers may include pointers, numerals, or other indicators to indicate landmarks or personal contacts on the map, for example, using a permanent indication, a flashing or blinking indication, an animated indication, a balloon or bubble indication, a pushpin indication, a highlighted or colorful indication, an indication visible upon hovering of a pointing device (e.g., a mouse) over a certain point of the map, or the like. In some embodiments, one or more audio indications, voice indications and/or sound indications may be used, for example, to indicate or to convey landmark information or landmark attributes.

In some embodiments, the mapping system 100 may optionally generate, for example, upon a user's request, a map showing the geo-spatial location of some or substantially all of the addresses and/or substantially all the entries that the user stored in the personal contacts database 123. Optionally, the generated map may include indications (e.g., textual indications, graphical indications, pointers, or the like) showing information (e.g., name and title and logo) about the personal contact in proximity to its location on the generated map. For example, the indication "John Smith, Attorney" may appear in a balloon or bubble indicator pointing towards the point of the generated map associated with the geographical address of John Smith according to the personal contacts database 123.

In some embodiments, the user may request a map including geographical indications of substantially all of the personal contacts associated with that user, and in response the mapping system 100 may generate the requested map. In other embodiments, the user may request a map including indications of a selected subset of the personal contacts associated with that user, and in response the mapping system 100 may generate the requested map. For example, the user may request a map including indications of personal contacts which may be pre-selected or marked by the user; the user may request a map including indications of personal contacts having a common attribute (e.g., family members, professional associates, clients, suppliers, entertainment establishments, entitles or categories containing a selected word (e.g., "attorney" or "restaurant" or "Smith"), or the like); the user may request a map including indications of personal contacts located in a certain city, located within a selected range or radius from a certain landmark or address or city; the user may request a map including indications of personal contacts located in a destination city, near a destination city, near a destination point, near a latitude/longitude point, or the like. In response, the mapping system 100 may generate the requested map.

In some embodiments, the route guidance generator 132 may generate route guidance information which may include road-based route guidance information, landmark-based route guidance information, and/or personal contacts route guidance information. For example, a user may request route guidance information for moving from an origin point to a destination point. In response, the route guidance generator 132 may generate a route having multiple route segments, associated with multiple portions of route guidance information. A portion of the route guidance information may be, for example, "Go south on Broadway and turn right on 23 rd Street", corresponding to road-based route guidance. A portion of the route guidance information may be, for example, "Go south on Broadway and turn right at the Flatiron building", corresponding to landmark-based route guidance. A portion of the route guidance information may be, for example, "Go south on Broadway and turn right on 23 rd Street, namely, turn right at the Flatiron building", corresponding to both road-based route guidance and landmark-based route guidance. A portion of the route guidance information may be, for example, "Go south on Broadway and turn right at the Citibank branch located at the corner of 32nd Street", corresponding to road-based route guidance combined with landmark-based information. A portion of the route guidance information may be, for example, "Go south on Broadway and turn right at the first street after you pass the Cinemax theater on your right side" corresponding to road-based route guidance combined with landmark-based information. A portion of the route guidance information may be, for example, "From the origin, drive towards your mother's house, and turn right after crossing your mother's house on the right side", corresponding to landmark-based information combined with personal contacts-based information. A portion of the route guidance information may relate to other off-route information or off-route landmarks, possibly including a relation to a landmark beyond the destination, for example, "Go south on Fifth Avenue, towards the Empire State Building that you can see straight ahead of you, but stop at the Chase bank at the corner of 39th Street and do not reach the Empire State Building ahead. Other suitable hybrid combinations of road-based route guidance information, landmark-based route guidance information, and/or personal contacts based route guidance information may be used by route guidance generator 132 to generate the requested route guidance.

In some embodiments, optionally, one or more levels of detail (e.g., generality or specificity) may be used in route guidance information generation. For example, a first portion of the generated route guidance information may be general, such as, "Go towards your sister's house", whereas a second portion of the generated route guidance information may be specific, such as, "Turn right at the Starbucks store located at the corner of 36th Street and Seventh Avenue". In some embodiments, generated route guidance information may include multiple route guidance information portions having a common level of detail. In other embodiments, generated route guidance information may include multiple route guidance information having multiple levels of detail.

In some embodiments, optionally, the route guidance generator 132 may generate route guidance information including one or more information portions which may be used for route validation, route segment validation, location or destination validation, route recognition, route segment recognition, location or destination recognition, user reassurance, or the like. For example, a route guidance information portion generated by the route guidance generator 132 may include a direction such as "Go south on Fifth Avenue for two miles, Central Park being on your right side, and make a right turn at the water fountain immediately at the end of Central Park". Such information portion may help the user understand or identify the route guidance information, recognize the correct route segment, orient the user, validate that the user drives along the correct route segment, reassure the user that the user drives along the correct route, or the like. A reassurance information generated by the route guidance generator 132 item may be, for example, "Go north on Sixth Avenue, make a left on 34th Street, and as you drive west on 34th Street you can see Macy's department store on your right side", corresponding to a landmark along the route segment which may be used for routing recognition, validation, orientation, or reassurance. The validating information portion may be used, for example, prior to advising the user of a change in the route, together with advising the user of a change in the route, or after advising the user of a change in the route. In some embodiment, reassurance information may be, for example, textual, non-textual, verbal, non-verbal, pictorial, photograph-based, illustrational, audible, or the like.

In some embodiments, optionally, the route guidance generator 132 may selectively determine which landmarks to include in the route guidance information, for example, from a group of multiple landmarks which may be used, based on one or more criteria or algorithms. In one embodiment, for example, the route guidance generator 132 may select to utilize a first landmark for route guidance instead of a second landmark, based on the physical visibility or physical properties of the landmarks. For example, a landmark having high visibility may be selected, a landmark having a relatively better visibility from a certain angle or route segment, a landmark having better night-time visibility, or the like. In another embodiment, the route guidance generator 132 may select to utilize a first landmark for route guidance instead of a second landmark, based on semantic recognition or a contextual property of the landmarks. For example, a six-feet sign showing an easily recognizable brand or logo or business name (e.g., Citibank or Hilton) may be selected for landmark-based route guidance instead of an eight-feet business sign showing an obscure writing which is less known or less recognizable (e.g., Jacob's Hardware Store or Aunt Sarah's Coffee Shop). In still another embodiment, the route guidance generator 132 may select to utilize a first landmark for route guidance, by itself and/or instead of a second landmark, based on estimated efficiency or relative efficiency of utilizing that landmark for route guidance or routing. For example, in some embodiments, a highly visible landmark may not be used for routing or route guidance if the determined routing that utilizes that landmark entails a significant detour or an increase in travel time or an increase in travel distance. In contrast, in some embodiments, a highly visible landmark may be used for routing or route guidance even if the determined routing that utilizes that landmark entails a relatively small detour or a relatively small increase (for example, up to a pre-defined percentage value) in travel time or travel distance. Other efficiency or efficiency-related algorithms or criteria may be used in order to determine whether or not to utilize a particular landmark (or personal contact) for routing or route guidance, and/or in order to determine whether to selectively utilize a first landmark and not a second landmark (or a first personal contact and not a second personal contact) for routing or route guidance.

In some embodiments, mapping system 100 may include or present an advertisement, a commercial, a coupon, a printable coupon or barcode, a discount coupon, or other items, which may be associated with a landmark used for routing or route guidance. For example, in some embodiments, mapping system 100 may utilize "John's Coffee Shop" as a landmark for route guidance, may generate route guidance information such as "make a left turn at John's Coffee Shop", and may further provide the user with a coupon which may be used or redeemed at John's Coffee Shop. In some embodiments, optionally, this may be performed if John's Coffee Shop agreed in advance to provide the coupon to the mapping system 100, if John's Coffee Shop paid an advertising fee to the operator of mapping system 100, or if other criteria or conditions are met. In some embodiments, for example, payment of an inclusion fee by a landmark owner may be a condition for utilizing that landmark for routing and/or route guidance provided by the mapping system 100.

In yet another embodiment, the route guidance generator 132 may select to utilize a first landmark for route guidance instead of a second landmark, based on economical and/or commercial criteria. For example, a first landmark may be selected for route guidance if the owner of the first landmark pays a fee (e.g., inclusion fee) to the operator of the mapping system 100 ("a cooperating landmark"); whereas a second landmark may not be used for route guidance if the owner of the second landmark does not pay the fee ("a non-cooperating landmark"). In still another embodiment, the route guidance generator 132 may select to utilize a first landmark for route guidance instead of a second landmark, based on other criteria, for example, contextual criteria. For example, if a user requests a route from his home to a podiatrist clinic, the mapping system 100 may select to utilize an orthopedic shoes store as a landmark, in the map generated by map generator 131 and/or in the route guidance information generated by the route guidance generator 132, instead of utilizing a coffee shop as a landmark.

In some embodiments, mapping system 100 or one or more components thereof may be implemented as part of a vehicular or portable navigation system, a vehicular or portable global positioning system (GPS) device, a vehicular or portable route determination or route guidance device, or the like. In other embodiments, mapping system 100 or one or more of components thereof may be implemented as a mapping server able to serve mapping queries of one or more clients (e.g., vehicular clients, portable clients, non-portable clients, or the like), a routing determination server able to serve route determination queries of one or more clients, a route guidance server able to serve route guidance queries of one or more clients, an Internet application or site, a World Wide Web application or web-site of web-page, a stand-alone software application, an embedded or integrated software application, an online or offline software or application utilized for searching names or phone numbers (e.g., directory applications, phone directories, directory assistance services, Yellow Pages directories or applications, White Pages directories or applications, or the like), or other suitable applications, services, devices or applications.

In some embodiments, a map generated by map generator 131 may selectively include only one item, or only some items, from a group of landmarks having a common property or attribute or category, or from a group of landmarks of a common type, or from a group of the same landmarks. The selection may be performed, for example, based on the usefulness of the selected landmark in route guidance to a destination. For example, in one embodiment, a village may have five gas stations, but not all of the five gas stations may be included or displayed in the map generated by map generator 131; instead, only a particular gas station useful for route guidance to a requested destination may be included or displayed in the generated map, for example, as to not obscure or over-crowd the generated map with information not relevant to route guidance. In some embodiments, for example, only one (or some) of a set of landmarks may be used or displayed for route guidance or navigation purposes, instead of using, including and/or displaying substantially all of (or a large number of) the landmarks.

In some embodiments, a map generated by map generator 131 may include landmarks and/or addresses and/or latitude/longitude of personal contacts, and may not include street names. Similarly, in some embodiments, route guidance information generated by route guidance generator 132 may include route guidance information based on landmarks and/or addresses and/or latitude/longitude of personal contacts, and may not include route guidance information based on street names.

In some embodiments, for example, mapping system 100 may optionally allow navigation based on non-linear elements, routing based on non-linear elements, and/or route guidance based on non-linear elements. For example, a routing determined by route generator 136 need not be along linear route segments, need not be along streets and avenues, and may utilize non-linear elements for routing or route guidance. In some embodiments, for example, mapping system 100 may allow landmark-based routing or route guidance, or personal contacts-based routing or route guidance, which may include crossing within a field, an open space, a shopping mall, a garden, a park, a national park, or the like. For example, in some embodiments, route guidance information generated by route guidance generator 132 and routes generated by routing generator 136 may not be limited to road-based routing (for example, "turn right at 24th Street"), but rather may include non-linear elements in routing, off-network routing or free-style routing (for example, "go south on Fifth Avenue, make a right turn into Central Park at the Water Fountain, then make a left turn before reaching the Lake"). In some embodiments, mapping system 100 may allow routing and/or route guidance which may utilize non-linear elements.

Some embodiments may utilize landmark-based routing and/or landmark-based route guidance. For example, landmark-based routing may include determination or calculation of a route based on one or more available or useful landmarks. For example, landmark-based routing may selectively determine to generate a first route which passes near a particular landmark useful for orientation or easily recognizable, instead of generating a second route which may not pass by that landmark. Additionally or alternatively, landmark-based route guidance may be used. For example, even if a route is determined or calculated without taking one or more landmarks into account, landmarks may still be used in the route guidance process, for example, by selectively and actively generating landmark-based route guidance information portions.

In some embodiments, mapping system 100 may utilize routing and/or route guidance based on addresses of personal contacts, in accordance with pre-defined criteria. In some embodiments, for example, addresses of personal contacts may be used for routing and/or route guidance based on the efficiency or relative efficiency of including the personal contact address in the determined route, or based on the efficiency or relative efficiency of routing or navigating or route guiding using a particular personal contact or landmark. In some embodiments, for example, personal contact addresses may be used for routing and/or route guidance if the destination is relatively far from the origin, and/or if a particular personal contact address is in proximity or relative proximity to the destination. For example, in one embodiment, a user may request route guidance information to move from 4th Street in New York City to 137th Street in New York City, and the personal contacts of that user may include a reference to "Jane Brown" whose office address is on 134th street in New York City; in response, the route guidance generator 132 may generate route guidance information such as "Go north on Sixth Avenue from 4th Street to Jane Brown's office on 134th Street", or (at a lower level of details, or a at a decreased level of details) "Get to Jane Brown's office then take the first right going north" followed by additional route guidance information to allow the user to reach his original destination.

In some embodiments, the information in the landmarks database 122 may be selectively and/or dynamically updated, upgraded, augmented, corrected, enhanced, or otherwise modified by one or more users of the mapping system 100, including local users and/or remote users. For example, a first version (e.g., a "native" version, an original version, an official version, or the like) of the information stored in the landmarks database 122 may include a first set of landmarks; whereas subsequent (e.g., second, third, or the like) versions of the information stored in the landmarks database 122 may include subsequent, updated, sets of landmarks. In some embodiments, landmark information may be tuned, fine-tuned, corrected, augmented, or otherwise modified based on users feedback, input or ratings and/or map data updates, and/or automatic feedback and/or input.

In some embodiments, for example, a user may indicate to mapping system 100 (for example, using the input unit 112) that a landmark used by mapping system 100 is not appropriate, not relevant, does not exist, ceased to exist, moved to a different location, is not visible, has low visibility, is obscured or hidden, is not useful, is confusing, is mapped incorrectly, or the like. In response, the landmarks database 122 may be updated, for example, by removing a landmark that ceased to exist, by updating the location of a landmark that moved, by correcting a location of a landmark having an incorrect landmark, or the like.

In some embodiments, for example, a user may indicate to mapping system 100 that an additional landmark may be added to the landmark database 122 and/or may be used by mapping system 100. For example, a user may indicate that a new coffee shop is open and is available to be used for routing or route guidance, that a prominent graffiti painted on a wall can be used for routing or route guidance, or the like. In response, the newly entered landmark may be added to the landmark database 122. A user may indicate the location of a new landmark, for example, utilizing a point-and-click interface, by providing a street address, by providing an offset from another landmark or from a street address, by providing latitude/longitude information, or the like. The user may enter a description of the landmark, for example, a textual description, a graphical description, a photograph, or other information associated with the landmark or identifying the landmark.

In some embodiments, a landmark entered by a user may be added to the landmark database 122 and may be used substantially immediately for routing and/or route guidance. In other embodiments, a newly entered landmark may be added to the landmark database 122 but may not be used for routing and/or route guidance until a pre-defined condition or criterion is met. For example, in one embodiment, a landmark entered by one user may not be used for routing and/or route guidance, whereas a landmark entered by more than one user may be used for routing and/or route guidance. In another embodiment, for example, a landmark may be used only after its details are entered and/or validated by a pre-defined number of users. In some embodiments, a landmark entered by a user may be associated with a rating value, and may be used for routing and/or route guidance if the rating value is larger than a pre-defined threshold. For example, a rating value may be increased if more than one user provide the landmark information to mapping system 100, if one or more users validate or confirm the correctness of the landmark and/or its usefulness for route guidance, if an independent or external source (e.g., a physical check, a GPS reading, an online check of correctness or validity, an online lookup or search through a database or a lookup table, or the like) confirms the correctness of the landmark and/or its usefulness for route guidance, if there is a significant shortage or absence of landmarks in the vicinity of the newly entered landmark, or the like.

In some embodiments, mapping system 100 may allow a user to provide feedback or input with regard to quality, correctness and/or usefulness of landmarks. For example, a user may indicate that a landmark is correct, incorrect, useful for route guidance, not useful for route guidance, misleading, visible, not visible, not visible at night, obsolete, or the like. The feedback or input may be collected from multiple users and may be stored in the landmark database 122. For example, a landmark stored in the landmark database 122 may be associated with a rating value, optionally stored in the landmark database 122.

In some embodiments, the rating value of landmarks may be taken into consideration by mapping system 100 in the process of map generation and/or route guidance generation. In one embodiment, for example, mapping system 100 may ignore landmarks having a rating value smaller than a pre-defined threshold. For example, map generator 131 may not include such landmarks in the generated maps, and route guidance generator 132 may not relate to such landmarks in the generated route guidance information. In another embodiment, for example, mapping system 100 may select to use a first landmark and not a second landmark, if the rating value associated with the first landmark is relatively higher or significantly higher than the rating value associated with the second landmark. Other suitable criteria may be used, and other suitable feedback values, rating values, correctness indicators, usefulness indicators, or quality indicators may be associated with landmarks.

Some embodiments may allow users to directly or indirectly update, correct, add, augment, delete and/or modify information stored in the landmark database 122. The information stored in the landmark database 122 may thus maintain or improve its accuracy and/or quality. For example, users' feedback and input may allow removal of landmarks that are obsolete and/or are not useful for navigation or route guidance, may allow addition of landmarks that are new and/or useful for navigation or route guidance, may allow validation of existing landmarks, may decrease the degradation rate or the decay rate of the information stored in landmark database 122, or the like.

In some embodiments, landmark database 122 may distinguish between landmarks included in an initial version of the database (e.g., "original" landmarks or "official" landmarks), and landmarks added to the database based on users feedback and input (e.g., "unofficial" landmarks, "social" landmarks, or users' landmarks). In one embodiment, a user of mapping system 100 may request a map and/or route guidance information utilizing only "official" landmarks and disregarding "unofficial" landmarks; and in response, the mapping system 100 may generate such map and/or route guidance information. In another embodiment, a user of mapping system 100 may request a map and/or route guidance information utilizing only "unofficial" landmarks and disregarding "official" landmarks; and in response, the mapping system 100 may generate such map and/or route guidance information. This may be performed, for example, if a user requests a map of a national park, which may not have streets and avenues or other "official" identifiers, but rather may have one or more "unofficial" landmarks entered by users and corresponding to various objects or features of the national park. In yet another embodiment, a user of mapping system 100 may request a map and/or route guidance information utilizing both "official" landmarks and "unofficial" landmarks; and in response, the mapping system 100 may generate such map and/or route guidance information. In still another embodiment, a user of mapping system 100 may request a map and/or route guidance information utilizing "official" landmarks and "unofficial" landmarks having a rating value greater than a user-selectable threshold value; and in response, the mapping system 100 may generate such map and/or route guidance information.

In some embodiments, the rating value of a landmark, or other quality indicator associated with the landmark, may be indicated on the map generated by mapping system 100. In some embodiments, a color scheme, a scoring scheme, or other graphical coding scheme may be used to indicate quality or relative quality of landmarks, to indicate that a landmark is "official" (e.g., originating from the operator of mapping system 100) or "unofficial" (e.g., added to the landmark database 122 based on users input), or the like.

In some embodiments, optionally, "unofficial" landmarks entered by users may be used for fine-tuning current map information and/or for mapping unmapped areas and/or for mapping unmapped locations and/or for mapping unmapped points. For example, a national park may be unmapped, a large shopping mall may be unmapped, an open field may be unmapped, a new housing development may be unmapped, roads may be unmapped, and other areas or locations may be substantially unmapped. Utilizing landmarks entered by users may allow the mapping system 100 to generate maps of such previously-unmapped locations and areas, for example, to allow users to explore the area, to allow users to traverse the area efficiently, to allow users to park a vehicle at a particular parking place in proximity to their destination, to allow users to enter or exit the area (or its vicinity) using a particular entry or exit to shorten their traveling period, or the like.

Some embodiments may be utilized to map substantially unmapped areas which still exist throughout the world today. Although most countries of the world may be topographically mapped, it is estimated that major portions of various countries are non-mapped, or non-mapped in a context of commercially digitized road network maps. Furthermore, even if a country is considered "substantially mapped", it is not completely (namely, 100 percent) road network-mapped, for example, since roads may disappear or get closed, new roads may appear, attributes change, new structures and neighborhoods erect, or the like. In addition, user generated content linked to maps is related to specific locations and/or landmarks and their offerings (for example, business, social, cultural or recreational), and may have spatial relevance for geocoding but not for map-usability or routing or route guidance.

In some embodiments, for example, a major road (e.g., highway I-95) may be included in a database of a mapping system, whereas street-level data may not be included in the database. According to some embodiments, information of official and/or unofficial landmarks may be stored in a landmark database, e.g., including a description of the landmark as well as its location (using address and/or longitude/latitude). For example, the major road may be stretched similar to a line from north to south, and four landmarks may be located on the east side of the major road, reviewing from north to south: a first landmark, "the Happy Winery", may be located across the street from a second landmark, "the Lion Fountain"; these two landmarks may be located 120 meters north of a third landmark, "the Regency Theater", which in turn may be located 75 meters north of a fourth landmark, "City Hall". The landmarks (or a subset thereof) may be used to generate, draw, render or otherwise refer to an unofficial road connecting the landmarks (or a subset thereof), and optionally a name may be associated with that road (e.g., "the Orange Tour Road"). The unofficial road, as well as the landmarks or a subset thereof, may optionally be super-imposed on map(s) or map layer(s).

Some embodiments may optionally include, or may be used in conjunction with, a geo-spatial layer that provides, for example, a uniformed method for recording and/or publishing local identifiers that accentuate a business location; guidance to locations via visual and/or intuitive features and attributes; advertising based on routing, association, and/or destination related information; and/or using a database having positional and/or directional landmark references.

In some embodiments, route guidance information may be landmark-based and/or personal contacts-based, and may utilize one or more route guidance attributes, for example, positional attributes (for example, "across from"), directive attributes (for example, "north or'), quality attributes or validity attributes or correctness attributes (for example, indication that a particular landmark is "validated" or is associated with a rating value or quality indicator), descriptive attributes (for example, color, height and/or shape of a landmark), dimensional attributes (for example, "top of an object, or "along the way" type attributes), logical attributes (for example, "drive to" or "walk to" attributes), or other attributes.

Some embodiments may allow, for example, to create or indicate geo-reference locations with nearby landmarks; to define new landmarks; to customize maps with logos of landmarks and/or references of landmarks; to present landmarks embedded within maps or as layers which may be overlaid on top of maps or removed from map displays; to determine landmark-based routing, for example, to determine a route from an origin to a destination based on availability of landmarks for routing purposes, based on visibility or quality of landmarks for routing purposes, or the like; to generate factual routing or route guidance, functional routing or route guidance, or predictive routing or route guidance; to allow location adjustment tools and tracking; to allow business promotion; to track location history; to optionally perform user profiling; to generate a references database with location derivatives; or the like.

In some embodiments, mapping system 100 may selectively determine and present to the user a first instead of a second route, based on a calculation that takes into account the efficiency or quality of landmark-based routing, for example, by itself and/or in comparison to road-based routing. Optionally, the determined route may not necessarily be the shortest route in length, but may be a route that a user can more easily follow in comparison with the shortest length route. For example, in some embodiments, mapping system 100 may selectively determine to use a first route segment or a first set of route segments, instead of a second segment or a second set of route segments, if the first route segment or set are associated with landmarks useful for route guidance and the second route segment or set are not associated with landmarks useful for route guidance, or if the landmarks associated with the first route segment or set have a higher quality or higher utility for route guidance purposes than the landmarks associated with the second route segment or set.

Some embodiments may allow efficient, user-friendly, quick, and/or improved routing, route guidance, navigation, route recognition, route segment recognition, or destination recognition. For example, some embodiments and/or landmark-based route guidance may be used if street names are not visible, if street names are not available, if the destination is not visible, if the destination is better accessed by walking rather than by driving, if multiple routes or route segments may be used to reach a destination, if multiple routes or multiple route segments are associated with street and/or landmarks having various types of visibility, or the like.

Some embodiments, for example, may bridge between information presented in a map and a user's spatial visualization abilities; may optimize or reduce driving time; may eliminate or reduce unnecessary circling-around; may reduce driving or routing complexity or risks; may promote business establishments in context of user-relevance and/or user-immediacy; and/or may create further levels or layers of local content that may enrich the user experience.

Some embodiments may provide benefits and/or advantages to one or more types of users. For example, in some embodiments, a business establishment may promote its physical location, may strengthen its brand name, may increase its brand recognition, and/or may increase its opportunity to transact business with a potential customer. In some embodiments, for example, a service provider may provide accurate, succinct and/or actionable location data, may increase its user base, and/or may reduce support overhead. In some embodiments, for example, a mobile solutions provider may provide products and services to consumers' attention when the consumers are mobile, and/or may increase advertising revenue. In some embodiments, for example, an application builder or developer may create unique application products, may target particular market segments, and/or may increase its market share. In some embodiments, for example, a map database vendor may trace real-life features and attributes, and/or may reduce its map updating costs. In some embodiments, for example, an end-user utilizing the mapping system 100 may be provided with improved user experience and satisfaction; effective matching of queries regarding business locations; increased safety achieved by routing utilizing prominent landmarks along the route; destination confirmation or route segment confirmation, achieved using visible location identifiers; improved planning and/or decision making; time saving and/or ability to arrive on time to the destination.

In some embodiments, maps generated by mapping system 100 may include or may allow, for example, a map view, a satellite view, a bird's eye view, a hybrid view, or other suitable views. In some embodiments, routing information or route guidance information generated by mapping system 100 may include, for example, driving directions, walking directions, bicycling directions, hiking directions, motor-biking directions, horse trail directions, horse riding directions, sailing directions, flying directions, reverse routing (e.g., allowing a user to easily request a reverse route leading from the destination to the origin), reverse route guidance (e.g., allowing a user to easily request route guidance information for a reverse route leading from the destination to the origin), shortest time routing, shortest distance routing, routing to avoid tolls, routing to minimize tolls, routing to avoid highways, routing to minimize highways, or the like. In some embodiments, maps generated by mapping system 100 may allow the user to perform various other actions, for example, to create or send a "permalink" to the generated map or information, to send by Email the generated map or information, to send to a mobile phone number the generated map or information (for example, using SMS message or MMS message), to watch live traffic associated with a map or a route or a landmark (for example, using a web-camera or other stream video component), to produce a printable or printer-friendly or printer-oriented version of the generated map or information (for example, in black and white, in grayscale, fitting printer page dimensions, or the like), to create a "bookmark" or "favorite" or "shortcut" or hyperlink pointing to or linking to the generated map or information, to allow a user to purchase prints of generated map or information, or the like.

In some embodiments, mapping system 100 may generate a map and/or route guidance information which may be utilized for driving reassurance, navigation reassurance, navigation validation, route recognition or route segment recognition. For example, a map generated by mapping system 100 may include a route segment (for example, a portion of a street between two intersections) and an indication that a particular landmark exists along that route segment. For example, the generated map may include an indication of a clock tower (or other landmark or personal contact), which may exist along the street, or which may be off the street but may be visible to a driver along that street. Additionally or alternatively, the route guidance information may include navigation reassurance information or items, for example, by optionally referring to landmarks or personal contacts which may be used to reassure a user or driver that he travels along the correct route or route segment. In some embodiments, the reassurance landmark or personal contact may be off-route, or may not be in proximity to the route or route segment; for example, the reassurance landmark or personal contact may be distant from a route or route segment but may be visible from the route segment or from a portion thereof.

In some embodiments, a reassurance information item may assure the user he performed a correct action, turn, maneuver, change of direction, progress, or the like. For example, a reassurance information item may include a phrase such as "Turn right into Highway 101, and after you make the right turn and continue driving for one mile, you will see a windmill on your left side". The reassurance information item may indicate to the user he correctly performed one or more maneuvers, or that the user is on the correct route to the destination.

In some embodiments, off-network or off-route landmarks may be used for navigation reassurance and/or for routing or route guidance. For example, in some embodiments, mapping system 100 may generate a map which may include indications of landmarks and/or personal contacts that may not be in proximity to a route or route segment, may be off-route or off-route-segment, may not be along or aside a route or a route segment, may not be reached by vehicle, may not be reached by vehicle and/or by foot, or other off-network landmarks or personal contacts. Additionally or alternatively, such off-network landmarks or personal contacts may be used for routing and/or for generating route guidance information. For example, generated route guidance information may include an item such as "Go south on Broadway, until you see the Empire State Building on your left side, and then turn left", even if the landmark of the Empire State Building in New York is off the Broadway route or route segment. In another example, the generated route guidance information may include an item such as "Drive south on I-95 highway until you see a water silo located half a mile inside an open field on the left side of the highway, and then take the next exit of the I-95 highway". In some embodiments, for example, an off-route landmark or personal contact may be included or otherwise utilized in the generated map or routing or route guidance information, for example, if the off-route landmark or personal contact is visible or otherwise recognizable from a particular route or route segment or a portion thereof.

In some embodiments, mapping system 100 may generate a hybrid map or hybrid route guidance information, for example, including one or more of: road-based map data, roadbased route guidance information, landmark-based map data, landmark-based route guidance information, personal contact-based map data, personal contact-based route guidance information, "official" and/or "unofficial" landmark-based map data, "official" and/or "unofficial" landmark-based route guidance information, and/or other suitable layers of information.

In some embodiments, mapping system 100 may generate, provide and/or display information (e.g., distance information, time information, or the like) relative to one or more landmarks and/or personal contacts. For example, a user may request route planning from an origin to a destination. In response, the mapping system 100 may notify the user that the destination is located 74 miles from the origin, that the destination is located two miles from the house of the user's brother (e.g., as derived from the personal contacts list associated with that user), that the destination is located at a distance of approximately three minutes driving from the office of Doctor Brown (e.g., as derived from the personal contacts list associated with that user), that the destination is located approximately 140 feet from the Empire State Building (e.g., derived from landmark information stored in the landmark database 122), that the destination is located at approximately two minutes driving distance from the Big Ben clock tower (e.g., derived from landmark information stored in the landmark database 122), or the like. In some embodiments, the distance information and/or the time-related information relative to one or more landmarks and/or personal contacts may be generated, presented, displayed and/or modified dynamically and/or in substantially real time, for example, taking into account a current position of the user (e.g., utilizing GPS information from GPS unit 135). In some embodiments, such information may provide, for example, reassurance to the user, peace-of-mind to the user, an improved estimation by the user of her estimated time of arrival (ETA) to her destination, an improved understanding by the user of the area of his destination, or the like.

Some embodiments of the invention may allow, for example, to refine or redefine landmarks data; to categorize landmark by map usage type (e.g., and not necessarily by business types); to rank landmarks by usability (e.g., and not necessarily by functionality); to use landmark changes in order to update a paid-advertising database; and/or to use landmark changes in order to update maps.

Some embodiments of the invention may allow, for example, landmark-based routing and/or guidance; visual route guidance, e.g., utilizing visual landmarks along the route; suggestive routing or user-intuitive routing; efficient routing to hard-to-reach destinations or to peculiar destinations; routing utilizing off-route landmarks and/or off-network landmarks; routing which uses substantially only GPS information and landmarks, without map display; routing utilizing one or more personal contacts; partial routing, in which route guidance information for a first route segment has reduced details or substantially no route guidance information (e.g., "go to your sister's house"), whereas route guidance for a second routing has increased details (e.g., "go south on Broadway, turn right at 37th Street"); destination reassurance, confirmation and/or recognition; route or route-segment reassurance, confirmation and/or recognition; and/or allowing the user to map substantially all his personal contacts, or a selected subset thereof.

Some embodiments of the invention may allow, for example, new search capabilities. For example, the mapping system may perform a search based on items or landmarks that are visible from a road or a route segment. In some embodiments, for example, the mapping system may generate a route and/or route guidance information, that selectively incorporate or utilize a certain type of landmarks (e.g., windmills), that selectively incorporate or utilize landmarks having a selected attribute (e.g., landmarks visible at night time), or the like.

Some embodiments of the invention may be used in conjunction with one or more payment schemes, for example, routing contextual-paid advertising; navigation-ranked advertising; promotional advertising (e.g., from business establishments that paid an inclusion fee); advertising purchased by a new business establishment to increase its exposure to users that seek routing or route guidance information; and/or other payment schemes or commercial contexts.

Some embodiments may allow a user to produce a map showing locations (and optionally other attributes, e.g., names) of his personal contacts or a selected subset thereof. Some embodiments may not necessarily utilize a fully operational mapping system, but rather may utilize a miniature version or a portable version or a stand-alone application or a plug-in for this purpose. For example, some embodiments may provide a software tool able to convert a list of personal contacts (e.g., from a Microsoft Outlook software, from a Palm or other PDA device, or the like) into map-ready information or map-able information, optionally utilizing one or more map APIs. The tool may be implemented, for example, as a stand-alone converter software, as an online application (e.g., the user may upload an exported list of personal contacts, and may download a converted list or a map incorporating the personal contacts), a plug-in or an extension to an existing software or to an existing device, or the like.

In some embodiments, system 100 and/or components thereof may be language-independent and/or multi-lingual. For example, system 100 may be able to receive input or data in one or more languages, and may be able to generate and/or present output or data in one or more languages. In some embodiments, a landmark may be associated with a textual description in one or more languages (e.g., English, Spanish, French, or the like), and system 100 may selectively utilize a textual description in a particular language, for example, based on a user selection of that language. In some embodiments, system 100 may concurrently utilize multiple languages. Other language support schemes may be used.

Figure 2:
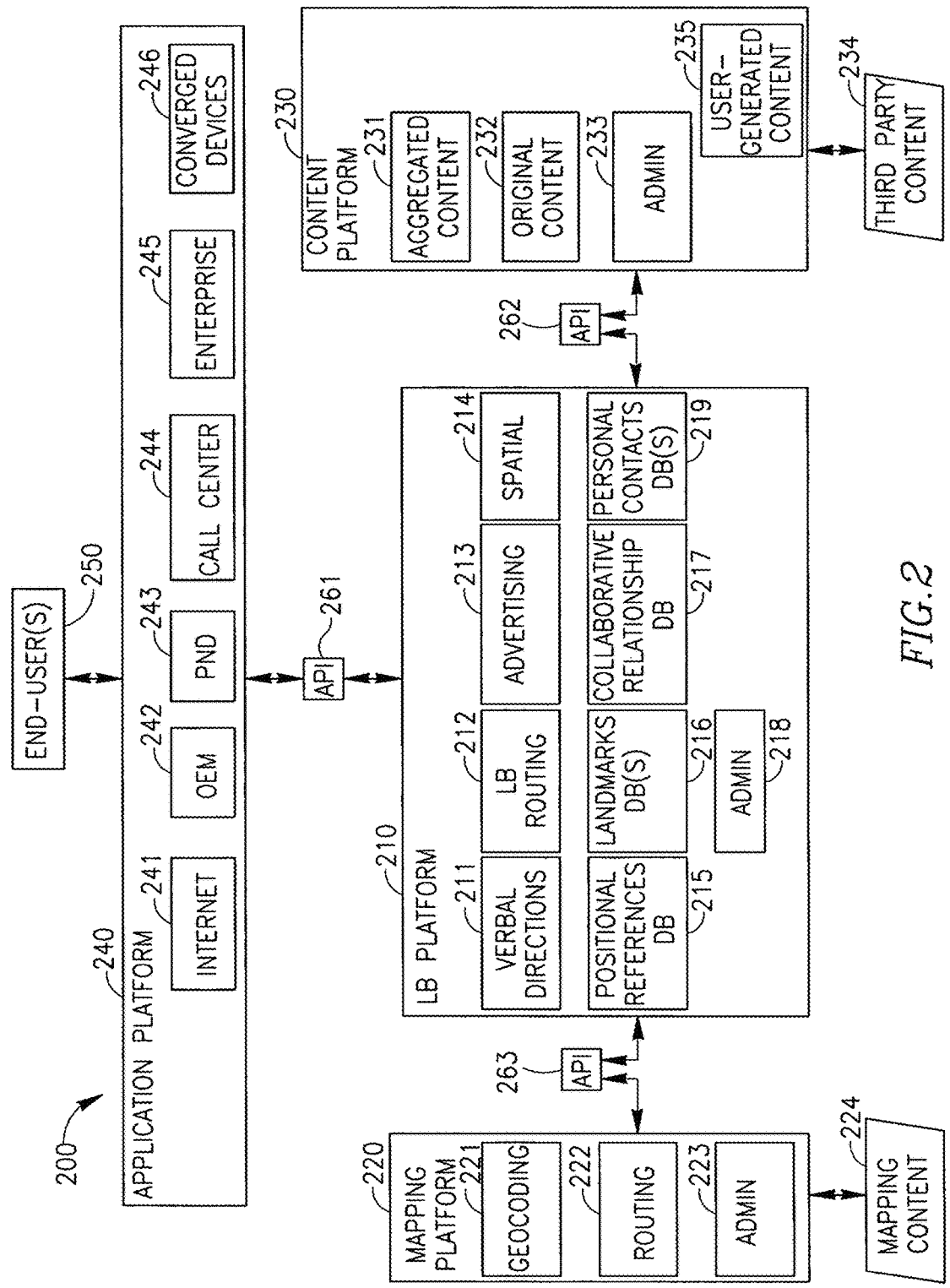
FIG. 2 is a schematic block diagram illustration of a mapping system able to generate landmark-based route guidance information in accordance with another demonstrative embodiment of the invention.

FIG. 2 schematically illustrates a block diagram of a mapping system 200 able to generate landmark-based routing guidance information in accordance with another demonstrative embodiment of the invention. In some embodiments, optionally, mapping system 200 may be a demonstrative implementation of mapping system 100 of FIG. 1.

System 200 may include, for example, a landmark-based (LB) platform 210, a mapping platform 220, a content platform 230, an application platform 240, and one or more end-user devices 250. System 200 may optionally include other suitable hardware components and/or software components.

The mapping platform 220 may include, for example, a geocoding module or unit 221 (e.g., including a geocoder and/or a reverse geocoder modules or units) able to convert road-based address data to latitude/longitude data or vice versa; a routing module or unit 222 (e.g., including a routing generator to determine a route and/or a route guidance generator to determine route guidance information) able to determine or compute a route, optionally having multiple route segments, between an origin and a destination; and an administration unit or module 223 to control the operation of mapping platform 220. The mapping platform 220 may include, or may be operably associated with, mapping content 224, for example, geo-spatial information from which mapping platform 220 may generate maps.

The content platform 230 may, for example, generate and/or handle content which may be added, combined with, linked to, and/or displayed with maps and/or route guidance information produced by mapping system 200. An aggregated content handler 231 may handle one or more types of content, for example, third-party content 234 (e.g., a list of bank branches and their respective locations as received from a banking institution), original content 232 (e.g., provided by a paying business establishment), and user-generated content 235 (e.g., created by users that are members of the general public). In some embodiments, optionally, aggregated content handler 231 may augment or modify information, for example, based on input received from other sources or from users. An administration unit or module 233 may control the operation of content platform 230. In some embodiments, content platform 230 or components thereof may administer and/or handle content of one or more types, e.g., original content, aggregated content, user-generated content, content provided or "fed in" by a third-party, or the like. In some embodiments, content aggregation may not necessarily be performed by content platform 230, but rather in one or more other components of system 200.

The LB platform 210 may include, for example, a verbal directions module or unit 211 able to record and/or publish landmarks leading to a destination; a spatial module or unit 214 able to generate a geo-spatial layer, for example, a vertical, multilateral, positional and/or thematic layer (e.g., a "virtual" spatial layer that may be combined with landmark-based guidance); an advertising module or unit 213 able to select or generate time-based, route-based, destination-based and/or context-based advertising; and a landmark-based routing module or unit 212 able to select and/or determine routes, route segments, or route guidance information utilizing landmarks and pre-defined criteria or preferences.

In some embodiments, one or more components of the LB platform 210 may be invoked, separately or cumulatively, by the application platform 240 or by components thereof. For example, a converged device 246 may utilize the verbal directions module 211 in order to provide to a user free-style route guidance information similar to verbal directions. The converged device 246 may utilize the landmark-based routing module 212 to provide to the user landmark-based routing, landmark-based reassurance information, routing reassurance information, route recognition information, destination recognition information, or the like. The advertising module 213 may be used to allow advertising using a map, for example, using visible landmark; for example, an advertisement may be selected or presented based on a landmark used for routing or for route guidance, and not necessarily based on a keyword used by a user.

In some embodiments, a positional reference database 215 of the LB platform 210 may include, for example, positions of landmarks as can be seen by the naked eye in context of blocks, road signs, intersections, buildings, mountains, etc. that can be spatially mapped. For example, a record for John Smith's office in the positional reference database 215 may indicate that John Smith's office is situated two blocks south of the corner of Main Street and. Fifth Avenue. In some embodiments, positional reference database 215 may include spatial information which may not be derived from a map database. This information may be utilized for route guidance to John's Smith's office in one or more ways. In some embodiments, for example, the route guidance information may guide the user to reach the corner of Main Street and Fifth Avenue, and then to turn right or left (e.g., depending on the direction the user arrives from) and go two blocks. In other embodiments, the route guidance information may guide the user to reach the corner of Main Street and Fifth Avenue and then to go south two blocks. Other suitable implementations may be used Some embodiments may utilize collaborative routing and/or collaborative route guidance information, for example, using positional references, positional relationships, attributes and/or semantics that provide non-topological relationships between landmarks, or information other than topology.

Some embodiments (e.g., embodiments that are able to determine a current location of a user in substantially real-time) may advise a user what is (or which landmarks are) around the user, what is (or which landmarks are) across from the user or ahead of the user, what is (or which landmarks are) next to the user or in proximity to the user or surrounding the user, what is (or which landmarks are) behind the user or in front of the user, what is (or which landmarks are) on the left side of the user, what is (or which landmarks are) on the right side of the user, what is (or which landmarks are) below the user, what can be seen (or which landmarks can be seen) by the user if the user looks up or down or left or right or to other directions, or other positional references or positional relationships to assist a user to locate or co-locate items or places. Some embodiments may utilize such information for route guidance.

The LB platform 210 may further include, or may be operably associated with, an administration unit or module 218 to control the operation of the LB platform or components thereof; one or more landmark database(s) 216 storing "official" landmarks indicated by the operator of mapping system 200 and/or "unofficial" landmarks added by users of mapping system 200; and a collaborative relationship database 217 storing semantic relationships between items or locations. In some embodiments, for example, information regarding a first landmark or a first business establishment may be marked as "validated" (e.g., true, or considered to be true) based on input received from a second landmark or a second business establishment; for example, the collaborative relationship database 217 may store an indication that the "Three Bears Parking Lot" is validated by "John's coffee shop" which is adjacent to that parking lot. In some embodiments, for example, the collaborative relationship database 217 may store indications that two or more particular landmarks are related to each other, for example, semantically, contextually, or non-topologically. For example, the collaborative relationship database 217 may store an indication that "Jack's Veterinarian Clinic" is located 30 meters away from, or across the street from, "Natalie's Pet Supply Shop". This information may be used, for example, to selectively utilize the first landmark ("Jack's Veterinarian Clinic") as route guidance information for a user that requests to reach the second landmark ("Natalie's Pet Supply Shop"), or vice versa, or to otherwise utilize or co-utilize the information.

The LB platform 210 may optionally store (e.g., in one or more databases) information of personal contacts of one or more users (optionally including geo-spatial information of such personal contacts), storing "cooperating landmarks" that paid an "inclusion fee" for their inclusion in maps for routing or route guidance purposes, or other landmarks information or landmark related information.

In some embodiments, for example, system 200 may utilize personal contacts of one or more users. For example, a personal contacts database 219 may be included in LB platform 210, or may be operable associated with LB platform 210, and may store information corresponding to personal contacts of one or more users (e.g., raw information of personal contacts, geo-coded information, reverse geo-coded information, converted information, reformatted information, or the like. In some embodiments, personal contacts information may be obtained separately from each end-user device 250 optionally using various or multiple formats or file types; may be stored separately on each end-user device 250 optionally using various or multiple formats or file types; may be obtained from each end-user device 250 and then stored separately or cumulatively in the LB platform 210 using one or more formats; may be converted from a first format to a second format, or from various multiple formats to a common format, and then stored; or may otherwise be obtained, converted, stored and/or utilized. In some embodiments, personal contacts may be stored by end-user devices 250, and may be converted or re-formatted for utilization by mapping system 200. Although system 200 shows the personal contacts database 219 as a component of the LB platform 210, embodiments of the invention are not limited in this regard, and personal contacts (in raw format or in converted format) may be stored and/or utilized by other components of system 200.

In some embodiments, the LB platform 210 may utilize (e.g., for mapping, for routing, and/or for route guidance information) a landmark whose owner paid an "inclusion fee", and may not utilize a landmark whose owner did not pay an "inclusion fee". In some embodiments, the LB platform 210 may not utilize a landmark if an "exclusion fee" was paid in order to exclude that landmark from utilization (e.g., paid by the landmark's owner, by a third party, by a competitor, or the like). In some embodiments, the LB platform 210 may utilize a first landmark of a particular category (e.g., a restaurant) and may not utilize a second landmark of that category if the owner of the first landmark paid an "exclusive fee" in order to remain exclusive, for example, for a pre-defined time period. Other conditions or criteria may be used.

The application platform 240 may allow communication between the LB platform 210, which may operate as a server in client/server architecture, and one or more end-user devices 250 which may operate as clients in a client/server architecture. The application platform 240 may include, for example, an internet connection module or unit 241 able to receive mapping queries, to send response to mapping queries, to receive route planning queries or route guidance queries, and/or to respond to route planning queries or route guidance queries; one or more OEM applications or modules 242, for example, an application that utilizes mapping and/or routing and/or route guidance; one or more personal navigation devices (PNDs) 243, a PND application, a PND server, or the like; a call center application or unit 244; an enterprise application or network 245; one or more converged devices 246; and/or other suitable components, units or modules.

Although portions of the discussion herein may relate, for demonstrative purposes, to systems or mapping systems using client/server architecture, embodiments of the invention are not limited in this regard, and may utilize other architectures or configurations. For example, in some embodiments, a mapping system or portions thereof may be implemented using stand-alone devices, a stand-alone hardware, a stand-alone software application, an embedded navigation system capable of operating in stand-alone mode, a stand-alone component in which multiple units (e.g., mapping system, landmarks database, content, or the like) are embedded in a client device or a stand-alone component, systems in which maps and/or landmark information and/or one or more databases are stored on CD or DVD or Flash cards or memory units or other storage units, or the like.

The LB platform 210 may communicate and/or exchange information with the application platform 240 using, for example, an application programming interface (API) 261. The LB platform 210 may communicate and/or exchange information with the mapping platform 220 using, for example, an API 263. The LB platform 210 may communicate and/or exchange information with the content platform 230 using, for example, an API 262.

In some embodiments, for example, the end-user devices 250 may include, for example, a mobile phone, a PDA device, a hybrid or combined mobile phone and PDA device, a desktop computer, a set-top box, a laptop computer, a portable computer, a pocket computer, a navigation device or unit, an Internet site, an Internet application, an online or offline application, or the like. The end-user device 250 may utilize the application platform 240, for example, to directly or indirectly request maps, route planning, and/or route guidance information. The application platform 240 may communicate with the LB platform 210, which may in turn generate and provide the requested data, for example, the requested maps, route planning, or route guidance information. The LB platform 210 may utilize landmark-based routing and/or personal contacts-based routing, may utilize data from the mapping platform 220, and may utilize content from the content platform 230. The requested maps, route planning, or route guidance information may be transferred back by the LB platform 210 to the end-user device 250 using the application platform 240.

FIGS. 3A-3D schematically illustrate demonstrative maps and routes which may be generated using some embodiments of the invention. The maps and/or routes may be generated, for example, by mapping system 100 of FIG. 1, by mapping system 200 of FIG. 2, or by other mapping systems or devices in accordance with embodiments of the invention.

Figure 3A:
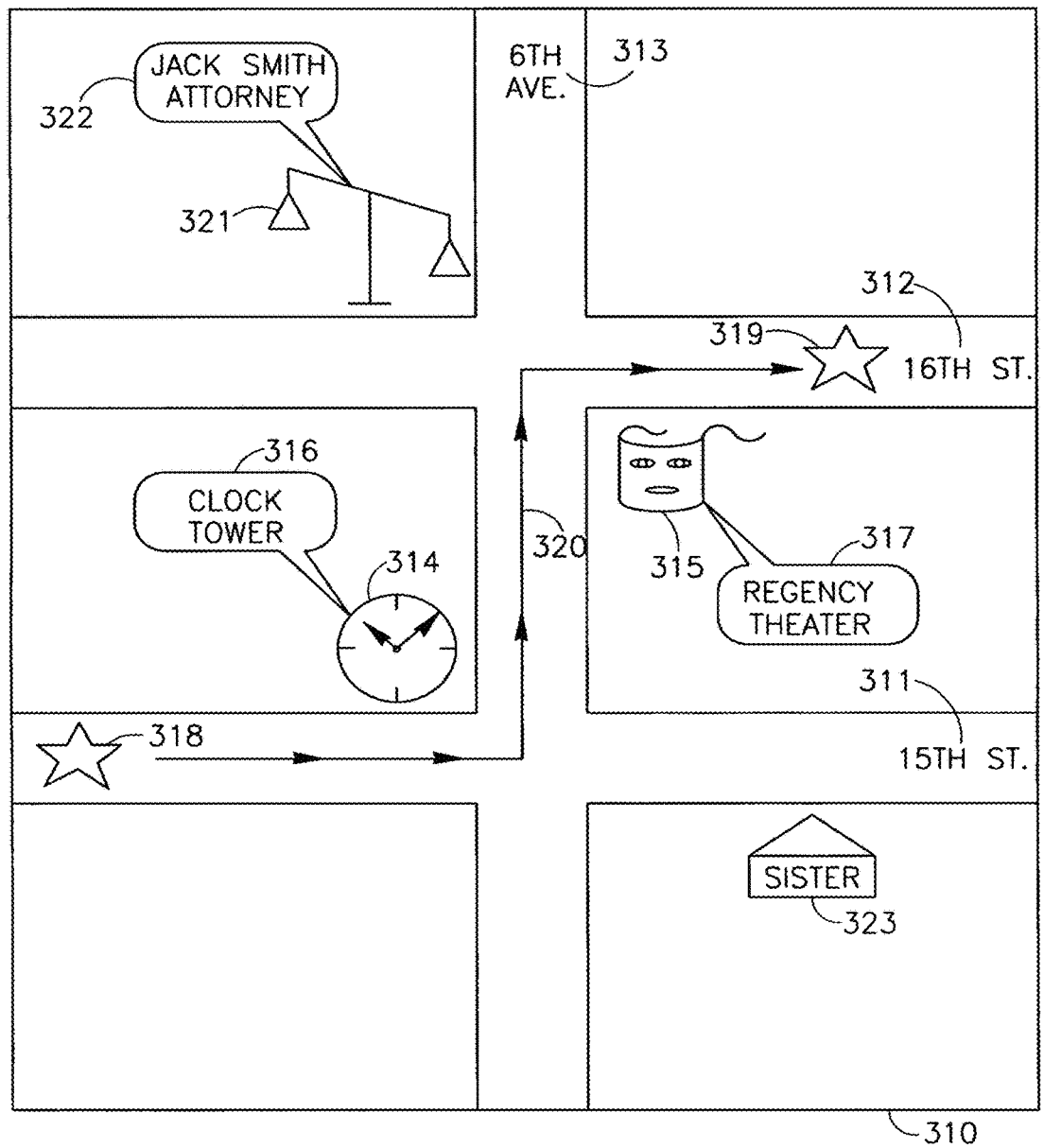
FIGS. 3A-3D are schematic illustrations of demonstrative maps and routes which may be generated using an embodiment of the invention.

As schematically illustrated in FIG. 3A, a generated map 310 may include, for example, road-based indications as well as landmark-based indications and/or personal contacts based indications. For example, map 310 may include indications of streets 311 and 312, an indication of an avenue 313, an indication of a landmark 314 (clock tower) and an indication of a landmark 315 (Regency theater). Map 310 may optionally include an indication for a route origin 318 and a route destination point 319.

In some embodiments, optionally, the landmark indications 314 and/or 315 may be represented using a graphical item having a contextual or symbolic meaning corresponding to the represented landmark or associated with the represented landmark. For example, the landmark 314 (clock tower) may be represented using a graphical item of a clock, and the landmark 315 (Regency theater) may be represented using a graphical item associated with the performing arts. Optionally, a landmark may be represented using an illustration of a logo or a trademark associated with the landmark. In other embodiments, for example, a landmark need not be represented using a graphical item associated with the landmark, and may be represented using a textual indication of the landmark's name or description (e.g., a "Clock Tower" textual representation).

In some embodiments, optionally, a bubble, a balloon, a pushpin, an icon, or other identifier may be presented in proximity to the landmark, for example, to provide a textual description or name or logo or other details about the landmark. For example, a balloon 316 having the text "Clock Tower" may be presented in proximity to landmark 314, and a balloon 317 having the text "Regency Theater" may be presented in proximity to landmark 315. In some embodiments, optionally, balloons 316 and 317, for example, may be permanently displayed or included in map 310, may be added into map 310 after a pre-defined time period, may be added into map 310 in response to a user request, may be added into map 310 in response to hovering of a pointing cursor over a landmark, may be removed from map 310 in response to a user request or after a pre-defined time period, or the like.

In some embodiments, map 310 may optionally include a route 320 or a portion thereof, for example, a driving route from origin 318 to destination point 319. Optionally, the route guidance information may be included and/or presented (e.g., optionally displayed with highlighting), for example, in proximity to presenting map 310. The route guidance information may include, for example, landmark-based routing or route guidance. For example, the route guidance information may include a textual item "make a left turn at the clock tower" and "turn right at the Regency theater".

In some embodiments, map 310 and route 320 may be presented or displayed in the context of a dynamic route guidance process, for example, using a vehicular or mobile navigation system, routing system, positioning system, or the like.

In some embodiments, maps may be presented from an angular or tilted point-of-view, from a driver's eye point-of-view, in line with a current moving direction of a vehicle, or the like. Other modes of display may be used.

In some embodiments, the display of the presented map may be dynamically modified and/or updated, substantially in real time, based on the progress or movement of the user along a route.

In some embodiments, optionally, map 310 may include representations of personal contacts of a user of map 310. For example, a personal contact indication 321 may represent the geographical location of "Jack Smith, Attorney" which details (name and address) may be included in the personal contacts of the user of map 310. Optionally, a balloon 322 may provide textual information or other information (for example, a photograph of the personal contact) corresponding with the indication 321. Similarly, a personal contact indication 323 may represent the geographical location of a sister of the user of map 310.

In some embodiments, the route guidance information associated with route 320 may optionally include information or instructions associated with the personal contacts represented by indications 321 and/or 323. For example, the route guidance item "make left at the clock tower" may be replaced by, or augmented with, the route guidance item "turn left at the last light before reaching your sister's house". Similarly, for example, the route guidance item "turn right at the Regency theater" may be replaced by, or augmented with, the route guidance item "make a right turn at the corner of Attorney Jack Smith's office".

Figure 3B:
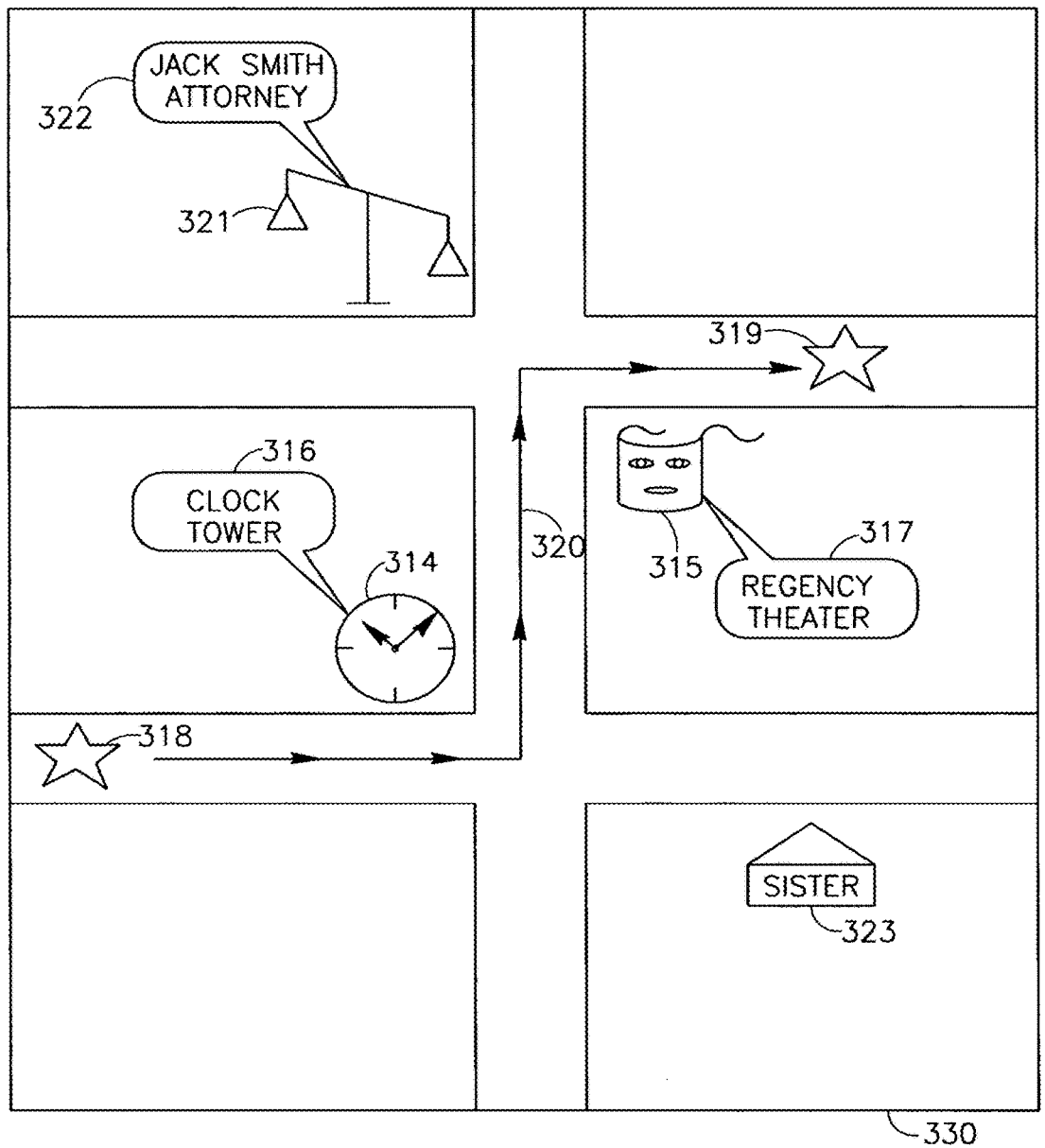

As schematically illustrated in FIG. 3B, another generated map 330 may include, for example, landmark-based indications and/or personal contacts-based indications, but may not include street names indications. For example, map 330 of FIG. 3B may be similar to map 310 of FIG. 3A, but map 330 of FIG. 3B may not include the street names indications 311 and 312 of FIG. 3A, and/or may not include the avenue name indication 313 of FIG. 3A. In some embodiments, some users may find map 330 to be less crowded with information and/or more convenient for their usage, in comparison with map 310 of FIG. 3A.

Figure 3C:
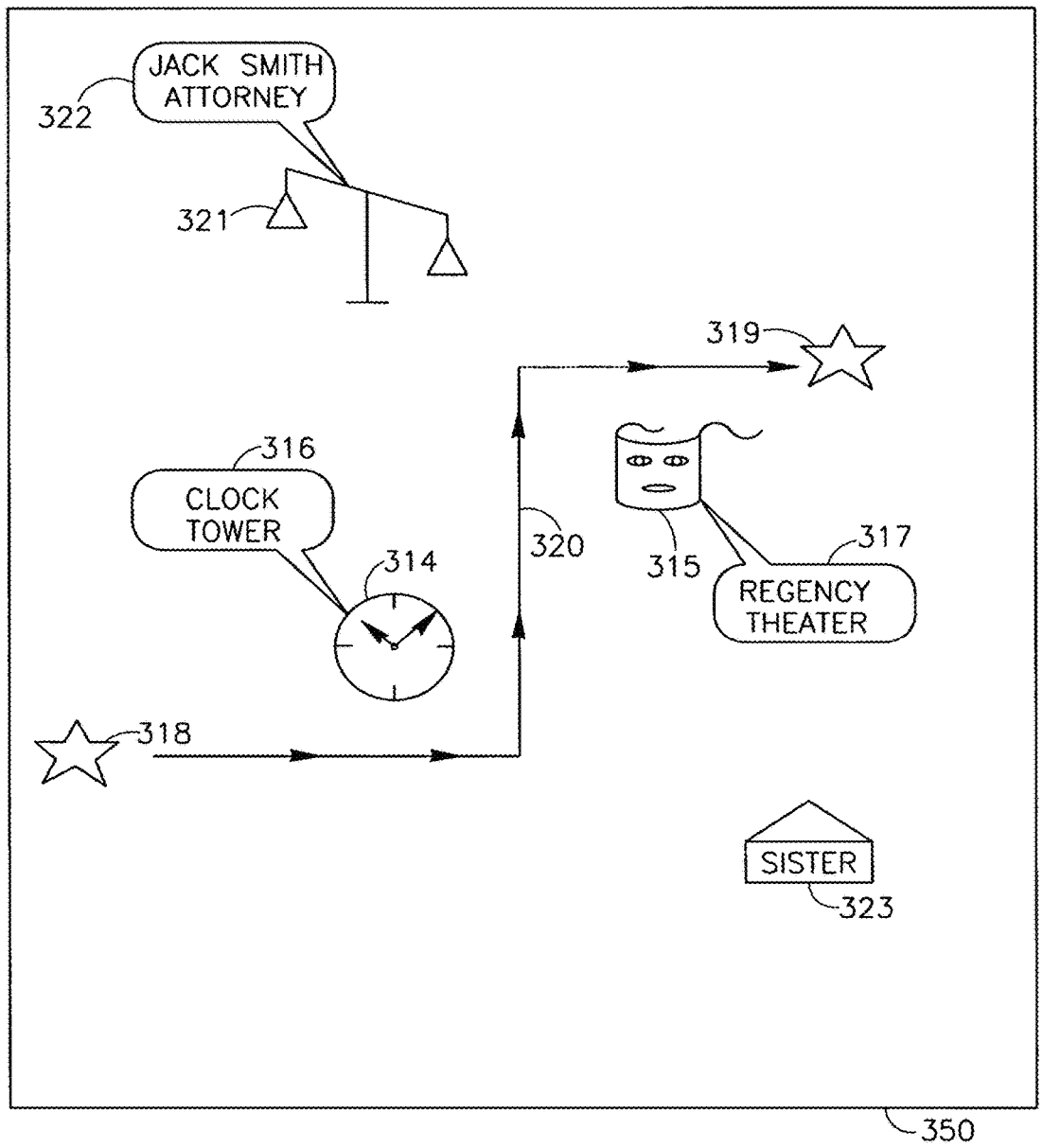

As schematically illustrated in FIG. 3C, yet another generated map 350 may include, for example, landmark-based indications and/or personal contacts-based indications, but may not include street names indications, and further may not include illustrations of streets or avenues. For example, map 350 of FIG. 3C may be similar to map 330 of FIG. 3B, but map 350 of FIG. 3C may not include the linear depiction of the streets and avenues. In some embodiments, some users may find map 350 of FIG. 3C to be less crowded with information and/or more convenient for their usage, in comparison with map 310 of FIG. 3A and/or map 330 of FIG. 3B.

Figure 3D:
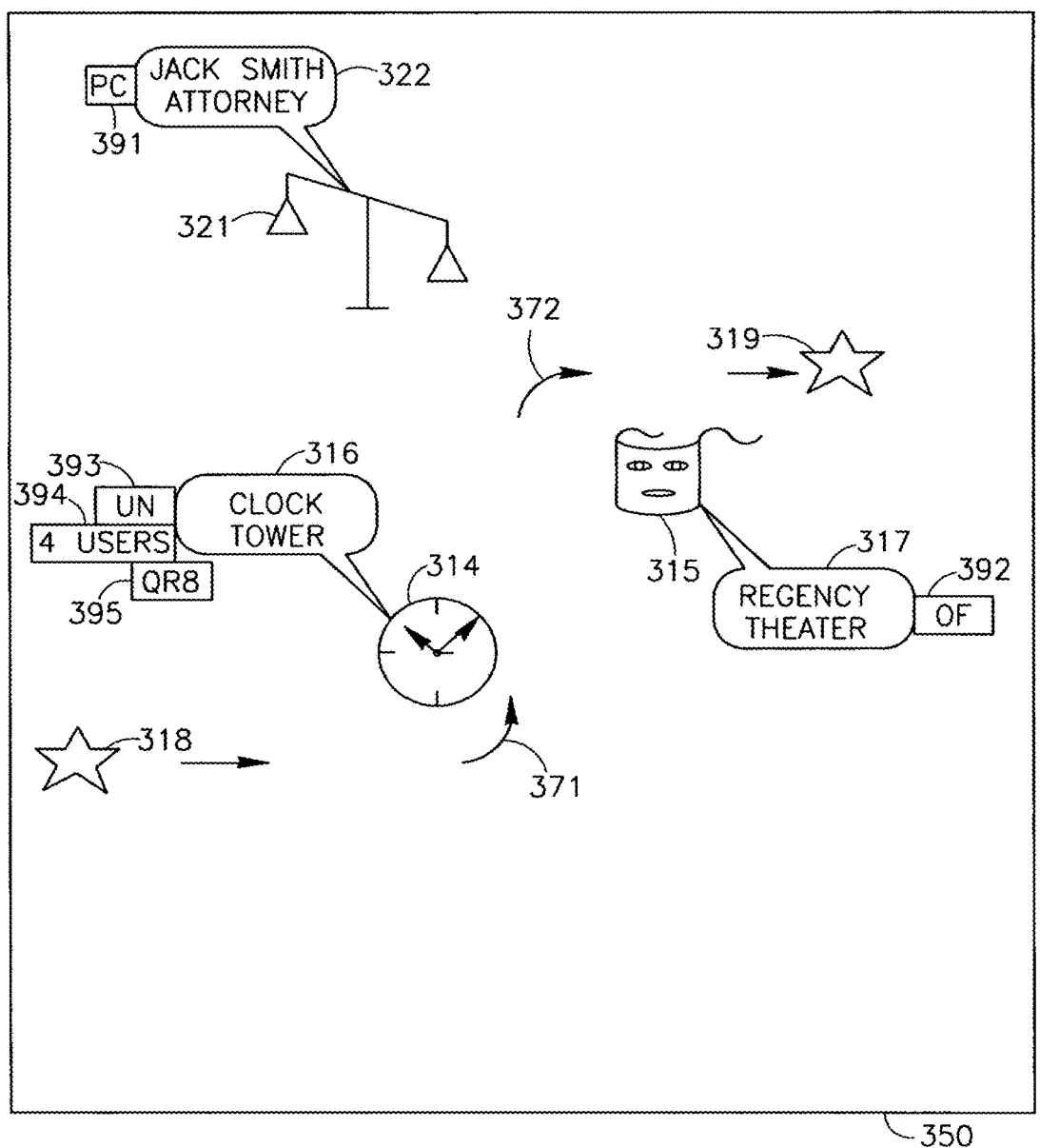

As schematically illustrated in FIG. 3D, still another generated map 370 may include, for example, landmark-based indications and/or personal contacts-based indications, but may not include street names indications, may not include illustrations of streets or avenues, and further may not include portions of the route 320 that are not required for navigation purposes. For example, map 370 of FIG. 3D may be similar to map 350 of FIG. 3C, but map 370 of FIG. 3D may not include linear depiction of segments of route 320, and may include only route segments 371 and 372 indicating a directional change or a navigational change in the route 320. In some embodiments, some users may find map 370 of FIG. 3D to be less crowded with information and/or more convenient for their usage, in comparison with map 310 of FIG. 3A and/or map 330 of FIG. 3B and/or map 350 of FIG. 3C.

In some embodiments, optionally, an indication on a map corresponding to a personal contact may include a representation notifying the user that this indication is based on a personal contact of the user. For example, as shown in FIG. 3D, the indication 321 of a personal contact may be accompanied by an indication 391, for example, showing the abbreviation "PC" in proximity to indication 321, thereby notifying the user that indication 321 is based on a personal contact. Other suitable indications may be used to notify the user that a particular map element is associated with a personal contact of the user, or is derived from the personal contacts list of the user.

In some embodiments, optionally, an indication on a map corresponding to an "official" landmark (e.g., a landmark having information which is created and/or validated by an administrator of the mapping system) may be presented together with a representation notifying the user that this indication is based on an "official" landmark. For example, as shown in FIG. 3D, the indication 317 of an official landmark may be accompanied by an indication 392, for example, showing "OF" in proximity to indication 317, thereby notifying the user that indication 317 is based on an official landmark. Other suitable indications may be used to notify the user that a particular map element corresponds to an official landmark.

In some embodiments, optionally, an indication on a map corresponding to an "unofficial" landmark (e.g., a landmark having information which is not created and/or non-validated by an administrator of the mapping system, or based on non-validated information contributed by one or more users) may be presented together with a representation notifying the user that this indication is based on an "unofficial" landmark. For example, as shown in FIG. 3D, the indication 316 of an unofficial landmark may be accompanied by an indication 393, for example, showing "UN" in proximity to indication 316, thereby notifying the user that indication 316 is based on an unofficial landmark. Other suitable indications may be used to notify the user that a particular map element corresponds to an unofficial landmark.

Although FIG. 3D shows, for demonstrative purposes, both an indication 392 of an "official" landmark and an indication 393 of an "unofficial" landmark, embodiments of the invention are not limited in this regard. In some embodiments, for example, a map may include indications of (and route guidance information may refer to) both official landmarks and unofficial landmarks; in other embodiments, a map may include indications of (and route guidance information may refer to) only official landmarks; in still other embodiments, a map may include indications of (and route guidance information may refer to) only unofficial landmarks; in yet other embodiments, a map may include indications of (and route guidance information may refer to) landmarks and/or unofficial landmarks based on user selection or based on "toggling" (on/off) official landmarks and/or unofficial landmarks.

Additionally or alternatively, an indication 394 showing "4 users" may notify the user that indication 316 corresponds to an unofficial landmark regarding which a total of four users contributed information. Additionally or alternatively, an indication 395 showing "QR 8" may notify the user that indication 316 corresponds to an unofficial landmark associated with a score or a "Quality Rating" (QR) having a value of eight (e.g., in accordance with a pre-defined scale or scoring scheme). Other suitable indications may be used to notify the user of various attributes of one or more personal contacts, official landmarks and/or unofficial landmarks.

Figure 4:
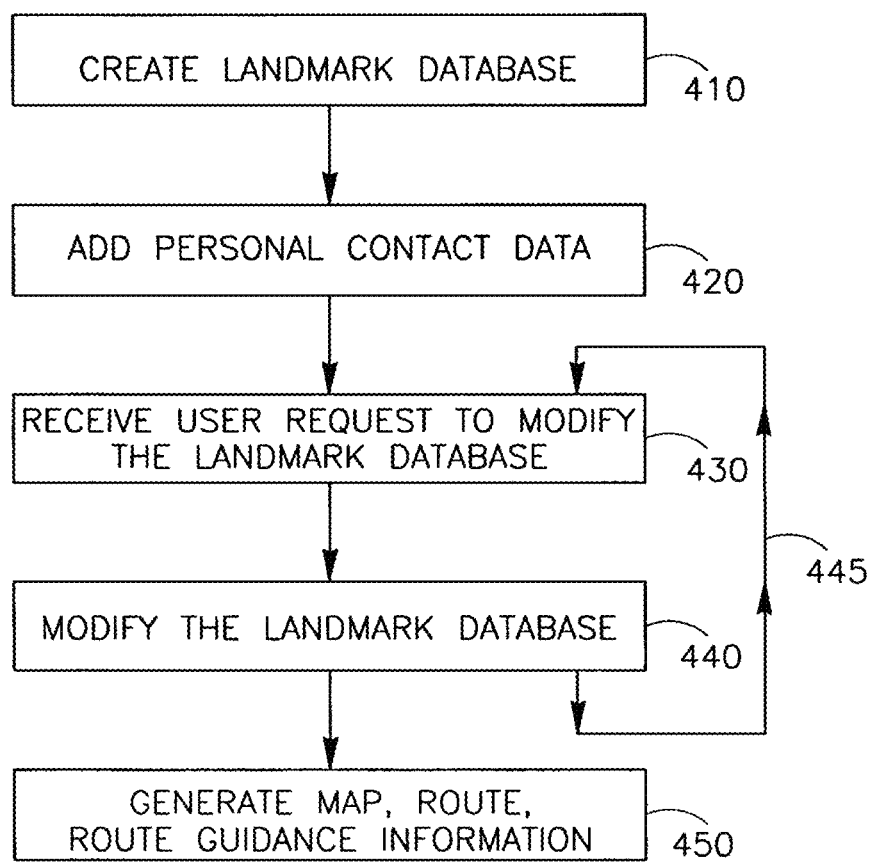
FIG. 4 is a schematic flow-chart of a method of mapping and routing in accordance with some embodiments of the invention.

FIG. 4 is a schematic flow-chart of a method of mapping and routing in accordance with some embodiments of the invention. Operations of the method may be implemented, for example, by mapping system 100 of FIG. 1, by mapping system 200 of FIG. 2, and/or by other suitable units, devices, and/or systems.

As indicated at block 410, the method may optionally include, for example, creating a landmark database. The landmark database may include, for example, landmark description data and landmark location data.

As indicated at block 420, the method may optionally include, for example, adding personal contacts data, e.g., to the landmark database or to another database. For example, personal contact description data and personal contact location data may optionally be added to the landmark database. This may optionally include importing, converting and/or reformatting of personal contact data.

As indicated at block 430, the method may optionally include, for example, receiving as input from one or more users an indication of a request to modify the landmark database. For example, the received input may include an indication of a request to add a landmark, an indication of a request to remove or delete a landmark, an indication of a request to modify a location or a description of a landmark, or the like.

In some embodiments, user input may be optional and need not be received in order to trigger an update or a modification of the landmark database. For example, some embodiments, may utilize automatic feedback which may not necessarily be based on a user request. For example, an automatic feedback may be transmitted or utilized based on GPS information, or based on other information sources or triggers. As indicated at block 440, the method may optionally include, for example, modifying the landmark database based on the received input. In some embodiments, optionally, the modification may be performed if one or more conditions are met, for example, if the modification is requested by a pre-defined number of users, if the modification is requested by a trusted source or user, if the requested modification is validated or verified, or the like.

In some embodiments, modification or updating of the landmark database may be performed manually, for example, by an administrator of the mapping system, based on users' feedback. In other embodiments, modification or updating of the landmark database may be performed automatically or semi-automatically. For example, in one embodiment, a data feed may indicate that a business establishment (or a chain of business establishments) is "out of business", and landmarks that are based on that business establishment (or chain) may automatically be removed or purged. In another embodiment, for example, information may be received (e.g., from one or more users, or from a third-party information provider) that a particular building is demolished (e.g., intentionally, demolished for re-construction, demolished due to a terror attack or an earthquake or hurricane storm, or the like); based on the received information, the landmark database may be updated substantially automatically, to remove or purge business establishments that existed in the demolished building. Other updating methods may be used.

In some embodiments, optionally, as indicated by arrow 445, the operations of blocks 430 and 440 may be repeated, for example, to allow updating of the landmark database from time to time, substantially continuously, at pre-defined time intervals, when one or more conditions are met, or the like.

As indicated at block 450, the method may optionally include, for example, generating a map, a route, and/or route guidance information, optionally including a reference to a landmark, for example, an off-route landmark.

Other operations or sets of operations may be used in accordance with embodiments of the invention.

Some embodiments of the invention may be implemented by software, by hardware, or by any combination of software and/or hardware as may be suitable for specific applications or in accordance with specific design requirements. Embodiments of the invention may include units and/or sub-units, which may be separate of each other or combined together, in whole or in part, and may be implemented using specific, multi-purpose or general processors or controllers, or devices as are known in the art. Some embodiments of the invention may include buffers, registers, stacks, storage units and/or memory units, for temporary or long-term storage of data or in order to facilitate the operation of a specific embodiment.

Some embodiments may include devices and/or systems using one or more suitable Operating Systems, for example, Microsoft Windows, Microsoft Windows XP, Microsoft Windows Vista, Microsoft Windows CE, Microsoft Windows Embedded, Microsoft Windows Mobile, Unix, Linux, Sun Solaris, Palm OS, J2ME, BREW, an OS used by BlackBerry device(s), or other suitable Operating Systems.

Some embodiments of the invention may be implemented, for example, using a machine-readable medium or article which may store an instruction or a set of instructions that, if executed by a machine, for example, by device 100 of FIG. 1, by processor 111 of FIG. 1, or by other suitable machines, cause the machine to perform a method and/or operations in accordance with embodiments of the invention. Such machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit (e.g., memory unit 114 or storage unit 115), memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), memory stick, secure digital (SD) memory card, Compact Disk Recordable (CD-R), Compact Disk Re-Writeable (CD-RW), optical disk, magnetic media, various types of Digital Versatile Disks (DVDs), a tape, a cassette, or the like. The instructions may include any suitable type of code, for example, source code, compiled code, interpreted code, executable code, static code, dynamic code, or the like, and may be implemented using any suitable high-level, low-level, object-oriented, visual, compiled and/or interpreted programming language, e.g., C, C++, Java, BASIC, Pascal, Fortran, Cobol, assembly language, machine code, or the like.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

The invention claimed is:

1. A method comprising:
receiving, from a client device by a system having a memory and at least one hardware processor, a request for route guidance information for moving from an origin to a destination;
calculating, by the system, a first route from the origin to the destination, the first route having a first travel measurement, the first travel measurement comprising a first travel time or a first travel distance;
calculating, by the system, a second route from the origin to the destination, the second route having a second travel measurement, the second travel measurement comprising a second travel time or a second travel distance, the second travel measurement being greater than the first travel measurement;
determining, by the system, a visibility level of a landmark corresponding to the second route;
determining, by the system, that a difference between the second travel measurement and the first travel measurement is within a predefined value;
selecting, by the system, the second route for use in the route guidance information based on the visibility level of the landmark corresponding to the second route and the determining that the difference between the second travel measurement and the first travel measurement is within the predefined value;
generating, by the system, the route guidance information based on the selection of the second route, the route guidance information comprising the second route and an indication of the landmark; and
causing, by the system, the client device to display the generated route guidance information within a user interface on the client device.

2. The method of claim 1, wherein the first travel measurement comprises the first travel time and the second travel measurement comprises the second travel time.

3. The method of claim 1, wherein the first travel measurement comprises the first travel distance and the second travel measurement comprises the second travel distance.

4. The method of claim 1, wherein the predefined value comprises a predetermined percentage.

5. The method of claim 1, wherein the visibility level comprises a level of visibility from a certain angle.

6. The method of claim 1, wherein the visibility level comprises a level of visibility from a certain route segment.

7. The method of claim 1, wherein the visibility level comprises a level of night-time visibility.

8. The method of claim 1, wherein the causing the generated route guidance information to be displayed on the client device comprises causing the second route and the indication of the landmark to be displayed on a map on the client device.

9. The method of claim 1, further comprising selecting the landmark for use with the second route based on a pre-defined condition being satisfied, the pre-defined condition comprising a pre-defined number of users entering the landmark to be added to a database or the pre-defined number of users validating the landmark.

10. A vehicle navigation system comprising:
at least one hardware processor; and
a non-transitory machine-readable medium having instructions stored thereon which when read and executed by the at least one hardware processor cause the at least one hardware processor to perform operations comprising:
receiving, from a client device, a request for route guidance information for moving from an origin to a destination;
calculating a first route from the origin to the destination, the first route having a first travel measurement, the first travel measurement comprising a first travel time or a first travel distance;
calculating a second route from the origin to the destination, the second route having a second travel measurement, the second travel measurement comprising a second travel time or a second travel distance, the second travel measurement being greater than the first travel measurement;
determining a visibility level of a landmark corresponding to the second route;
determining that a difference between the second travel measurement and the first travel measurement is within a predefined value;
selecting the second route for use in the route guidance information based on the visibility level of the landmark corresponding to the second route and the determining that the difference between the second travel measurement and the first travel measurement is within the predefined value;
generating the route guidance information based on the selection of the second route, the route guidance information comprising the second route and an indication of the landmark; and
causing the client device to display the generated route guidance information within a user interface on the client device.

11. The vehicle navigation system of claim 10, wherein the first travel measurement comprises the first travel time and the second travel measurement comprises the second travel time.

12. The vehicle navigation system of claim 10, wherein the first travel measurement comprises the first travel distance and the second travel measurement comprises the second travel distance.

13. The vehicle navigation system of claim 10, wherein the predefined value comprises a predetermined percentage.

14. The vehicle navigation system of claim 10, wherein the visibility level comprises a level of visibility from a certain angle.

15. The vehicle navigation system of claim 10, wherein the visibility level comprises a level of visibility from a certain route segment.

16. The vehicle navigation system of claim 10, wherein the visibility level comprises a level of night-time visibility.

17. The vehicle navigation system of claim 10, wherein the causing the generated route guidance information to be displayed on the client device comprises causing the second route and the indication of the landmark to be displayed on a map on the client device.

18. The vehicle navigation system of claim 10, wherein the operations further comprise selecting the landmark for use with the second route based on a pre-defined condition being satisfied, the pre-defined condition comprising a predefined number of users entering the landmark to be added to a database or the pre-defined number of users validating the landmark.

19. A non-transitory machine-readable medium having instructions stored thereon which when read and executed by at least one hardware processor cause the at least one hardware processor to perform operations comprising:
   receiving, from a client device, a request for route guidance information for moving from an origin to a destination;
   calculating a first route from the origin to the destination, the first route having a first travel measurement, the first travel measurement comprising a first travel time or a first travel distance;
   calculating a second route from the origin to the destination, the second route having a second travel measurement, the second travel measurement comprising a second travel time or a second travel distance, the second travel measurement being greater than the first travel measurement;
   determining a visibility level of a landmark corresponding to the second route;
   determining that a difference between the second travel measurement and the first travel measurement is within a predefined value;
   selecting the second route for use in the route guidance information based on the visibility level of the landmark corresponding to the second route and the determining that the difference between the second travel measurement and the first travel measurement is within the predefined value;
   generating the route guidance information based on the selection of the second route, the route guidance information comprising the second route and an indication of the landmark; and
   causing the client device to display the generated route guidance information within a user interface on the client device.

20. The non-transitory machine-readable medium of claim 19, wherein the first travel measurement comprises the first travel time and the second travel measurement comprises the second travel time.

* * * * *